United States Patent
Yang

(10) Patent No.: US 10,674,450 B2
(45) Date of Patent: Jun. 2, 2020

(54) SYSTEM AND METHOD FOR ASYNCHRONOUS WAKE-UP MODE AND RELATED MODE SWITCHING

(71) Applicant: FutureWei Technologies, Inc., Plano, TX (US)

(72) Inventor: Yunsong Yang, San Diego, CA (US)

(73) Assignee: FutureWei Technologies, Inc., Plano, TX (US)

( * ) Notice: Subject to any disclaimer, the term of this patent is extended or adjusted under 35 U.S.C. 154(b) by 110 days.

(21) Appl. No.: 15/843,484

(22) Filed: Dec. 15, 2017

(65) Prior Publication Data

US 2018/0279224 A1 Sep. 27, 2018

Related U.S. Application Data

(60) Provisional application No. 62/474,871, filed on Mar. 22, 2017.

(51) Int. Cl.
*H04W 52/02* (2009.01)

(52) U.S. Cl.
CPC ..... *H04W 52/0235* (2013.01); *H04W 52/028* (2013.01); *H04W 52/0229* (2013.01); *Y02D 70/00* (2018.01); *Y02D 70/10* (2018.01); *Y02D 70/1262* (2018.01); *Y02D 70/14* (2018.01); *Y02D 70/142* (2018.01);
(Continued)

(58) Field of Classification Search
CPC combination set(s) only.
See application file for complete search history.

(56) References Cited

U.S. PATENT DOCUMENTS

| 2009/0103501 A1* | 4/2009 | Farrag | H04W 74/02 370/337 |
| 2010/0112950 A1* | 5/2010 | Haartsen | H04B 5/0056 455/41.3 |

(Continued)

FOREIGN PATENT DOCUMENTS

| CN | 102421171 A | 4/2012 |
| CN | 102484540 A | 5/2012 |

(Continued)

OTHER PUBLICATIONS

Park et al., "Low-Power Wake-Up Receiver (LP-WUR) for 802.11," IEEE 802.11-15/1307r1, Minyoung Park, Intel Corporation, Nov. 10, 2015, 18 pages.

(Continued)

*Primary Examiner* — Yee F Lam
(74) *Attorney, Agent, or Firm* — Slater Matsil, LLLP

(57) ABSTRACT

A method for operating a wake-up radio (WUR) receiver of a receiving device includes receiving, from a transmitting device, information conveying a first mode of operation and a second mode of operation, wherein the first mode of operation is used for operating the WUR receiver of the receiving device when the transmitting device does not transmit any WUR beacons and the second mode of operation is used for operating the WUR receiver of the receiving device when the transmitting device transmits WUR beacons periodically, and determining, by the receiving device, that the transmitting device does not transmit any WUR beacons, and based thereon, operating, by the receiving device, the WUR receiver of the receiving device in accordance with the first mode of operation.

20 Claims, 14 Drawing Sheets

(52) U.S. Cl.
CPC .......... *Y02D 70/144* (2018.01); *Y02D 70/162* (2018.01); *Y02D 70/20* (2018.01); *Y02D 70/22* (2018.01); *Y02D 70/23* (2018.01); *Y02D 70/26* (2018.01)

(56) References Cited

U.S. PATENT DOCUMENTS

| | | | | |
|---|---|---|---|---|
| 2014/0112225 | A1* | 4/2014 | Jafarian | H04W 52/0235 370/311 |
| 2015/0208349 | A1 | 7/2015 | Ramamurthy et al. | |
| 2015/0282076 | A1* | 10/2015 | Larmo | H04W 52/0209 370/311 |
| 2016/0381638 | A1* | 12/2016 | Min | H04W 52/0235 370/311 |
| 2017/0026907 | A1* | 1/2017 | Min | H04W 52/0229 |
| 2017/0134943 | A1* | 5/2017 | Min | H04W 12/06 |
| 2017/0280498 | A1* | 9/2017 | Min | H04L 5/0053 |
| 2018/0018185 | A1* | 1/2018 | Sun | H04W 76/11 |
| 2018/0019902 | A1* | 1/2018 | Suh | H04L 27/2602 |
| 2018/0020501 | A1* | 1/2018 | Aboul-Magd | H04L 27/2602 |
| 2018/0049130 | A1* | 2/2018 | Huang | H04W 52/0235 |
| 2018/0049131 | A1* | 2/2018 | Huang | H04W 52/0235 |
| 2018/0063788 | A1* | 3/2018 | Yang | H04L 9/00 |
| 2018/0084501 | A1* | 3/2018 | Mu | H04L 69/324 |
| 2018/0103431 | A1* | 4/2018 | Suh | H04B 1/16 |
| 2018/0132176 | A1* | 5/2018 | Abraham | H04L 43/087 |
| 2018/0234918 | A1* | 8/2018 | Asterjadhi | H04W 52/0216 |
| 2018/0242248 | A1* | 8/2018 | Huang | H04W 52/0216 |
| 2018/0262865 | A1* | 9/2018 | Lepp | H04W 4/80 |

FOREIGN PATENT DOCUMENTS

| | | |
|---|---|---|
| CN | 102857372 A | 1/2013 |
| CN | 104853391 A | 8/2015 |
| CN | 105103476 A | 11/2015 |
| CN | 106376051 A | 2/2017 |
| CN | 106501682 A | 3/2017 |
| EP | 2400799 A2 | 12/2011 |
| EP | 3010289 A1 | 4/2016 |
| WO | 2013025295 A1 | 2/2013 |

OTHER PUBLICATIONS

Park et al., "LP-WUR (Low-Power Wake-Up Receiver): Enabling Low-Power and Low-Latency Capability for 802.11," IEEE 802.11-16/0027r0, Minyoung Park, Intel Corporation, Jan. 18, 2016, 21 pages.

Park et al., "LP-WUR (Low-Power Wake-Up Receiver) Follow-Up," IEEE 802.11-16/0341r0, Minyoung Park, Intel Corporation, Mar. 14, 2016, 9 pages.

"Draft Standard for Information technology—Tele-communications and information exchange between systems Local and metropolitan area networks—Specific requirements, Part 11: Wireless LAN Medium Access Control (MAC) and Physical Layer (PHY) Specifications, Amendment 9: Wake-Up Radio Operation," IEEE P802.11ba/D0.1, Jan. 2018, 54 pages.

"Draft Standard for Information technology—Tele-communications and information exchange between systems Local and metropolitan are networks—Specific requirements, Part 11: Wirless LAN Medium Access Control (MAC) and Physical Layer (PHY) Specifications, Amendment 9: Wake-Up Radio Operation," IEEE P802.11ba/D0.3, IEEE Computer Society, May 2018, 70 pages.

* cited by examiner

SYSTEM AND METHOD FOR ASYNCHRONOUS WAKE-UP MODE AND RELATED MODE SWITCHING

This application claims the benefit of U.S. Provisional Application No. 62/474,871, filed on Mar. 22, 2017, entitled "System and Method for Asynchronous Wake-up Mode and Related Mode Switching," which application is hereby incorporated herein by reference in its entirety.

TECHNICAL FIELD

The present disclosure relates generally to a system and method for digital communications, and, in particular embodiments, to a system and method for asynchronous wake-up mode and related mode switching.

BACKGROUND

Power consumption is a key consideration in devices that are battery powered. A design criterion for a battery powered device is to minimize power consumption to extend the period of time between battery recharges or replacement as much as possible. In some deployments, such as remotely located sensors, battery replacement may be both impractical as well as expensive. Even in situations where the battery powered device is readily available and recharging is easy, such as in cellular telephones, tablets, laptop computers, wearable devices (WDs), and so on, recharging the battery is still an inconvenient and time consuming task.

Radio communications modules (RCMs), which provide wireless connectivity that is so vital to the operation of these battery powered devices, is also a significant source of power consumption. In general, the more complex the communications or greater range supported by the RCM, the greater the power consumption. A reduction in power consumption is realizable by putting one or more RCMs of a battery powered device into sleep (or power off, power saving, power reduced, inactive) mode when there is no need of data communications while maintaining a simple, low-power wake-up receiver to receive a wake-up packet. The wake-up packet is transmitted by another device to wake up at least one of the one or more RCMs of the battery powered device in order to resume data communications with the battery powered device. The Institute of Electrical and Electronics Engineers (IEEE) 802.11 Working Group has initiated a standard amendment project referred to as the 802.11ba Amendment to standardize such wake-up technique to be added to the 802.11 family of standards.

SUMMARY

Example embodiments provide a system and method for asynchronous wake-up mode and related mode switching.

In accordance with an example embodiment, a method for operating a wake-up radio (WUR) receiver of a receiving device is provided. The method includes receiving, by the receiving device from a transmitting device, information conveying a first mode of operation and a second mode of operation, wherein the first mode of operation is used for operating the WUR receiver of the receiving device when the transmitting device does not transmit any WUR beacons and the second mode of operation is used for operating the WUR receiver of the receiving device when the transmitting device transmits WUR beacons periodically, and determining, by the receiving device, that the transmitting device does not transmit any WUR beacons, and based thereon, operating, by the receiving device, the WUR receiver of the receiving device in accordance with the first mode of operation.

Optionally, in any of the preceding embodiments, an embodiment wherein determining that the transmitting device does not transmit any WUR beacon comprises receiving, by the receiving device, from the transmitting device, one of a WUR beacon interval field set to a pre-specified value, a WUR packet including a pre-specified identifier conveying that the transmitting device does not transmit any WUR beacon, or no WUR beacons within a specified time period, wherein the WUR beacon interval field is included in a frame received by a radio communications module (RCM) of the receiving device, and wherein the WUR packet is received by the WUR receiver of the receiving device.

Optionally, in any of the preceding embodiments, an embodiment wherein the method further comprises determining, by the receiving device, that the transmitting device transmits WUR beacons periodically, and based thereon, operating, by the receiving device, the WUR receiver of the receiving device in accordance with the second mode of operation, wherein determining that the transmitting device transmits WUR beacons periodically comprises receiving, by the receiving device, from the transmitting device, one of a WUR beacon interval field set to a value unequal to a pre-specified value, a WUR packet including a pre-specified identifier conveying that the transmitting device transmits WUR beacons periodically, or a specified number of WUR beacons within a specified time period, wherein the WUR beacon interval field is included in a frame received by a RCM of the receiving device, wherein the WUR packet or the specified number of WUR beacons are received by the WUR receiver of the receiving device.

Optionally, in any of the preceding embodiments, an embodiment wherein the first mode of operation is one of an always-on mode or an asynchronous duty-cycled mode, and the second mode of operation is one of the always-on mode, the asynchronous duty-cycled mode, or a synchronous duty-cycled mode.

Optionally, in any of the preceding embodiments, an embodiment wherein the always-on mode is a mode in which the WUR receiver of the receiving device is active as long as a RCM of the receiving device is operating in a power-saving mode, wherein the asynchronous duty-cycled mode is a mode in which the WUR receiver of the receiving device is active during On periods of repeating duty cycle periods and inactive during Off periods of the repeating duty cycle periods as long as the RCM of the receiving device is operating in the power-saving mode, beginnings and endings of the On periods of the repeating duty cycle periods are determined in accordance with a clock of the WUR receiver of the receiving device, and the clock of the WUR receiver of the receiving device is unsynchronized with a clock of the transmitting device, and wherein the synchronous duty-cycled mode is a mode in which the WUR receiver of the receiving device is active during the On periods of the repeating duty cycle periods and inactive during the Off periods of the repeating duty cycle periods as long as the RCM of the receiving device is operating in the power-saving mode, the beginnings and the endings of the On periods of the repeating duty cycle periods are determined in accordance with the clock of the WUR receiver of the receiving device, and the clock of the WUR receiver of the receiving device is synchronized with the clock of the transmitting device.

Optionally, in any of the preceding embodiments, an embodiment wherein the information conveying the always-on mode comprises one of a first value of a mode subfield set in accordance with the always-on mode, a zero value of an off duration subfield, or a duty-cycle duration subfield set equal to an on duration subfield, wherein the information conveying the asynchronous duty-cycled mode comprises a second value of the on duration subfield and one of a third value of the off duration subfield set greater than zero or a fourth value of the duty-cycle duration subfield set greater than the second value, and wherein the information conveying the synchronous duty-cycled mode comprises a fifth value of the on duration subfield, a sixth value of an offset subfield, and one of a seventh value of the off duration subfield set greater than zero or an eighth value of the duty-cycle duration subfield set greater than the fifth value.

In accordance with an example embodiment, a method for operating a transmitting device is provided. The method includes transmitting, by the transmitting device, information conveying a first mode of operation and a second mode of operation to a receiving device, wherein the first mode of operation is used for operating a WUR receiver of the receiving device when the transmitting device does not transmit any WUR beacon and the second mode of operation is used for operating the WUR receiver of the receiving device when the transmitting device transmits WUR beacons periodically, determining, by the transmitting device, whether to transmit WUR beacons periodically, wherein each of the WUR beacons includes a clock information of the transmitting device, in response to determining not to transmit any WUR beacon, stopping, by the transmitting device, transmission of any pending WUR beacons, and waking up, by the transmitting device, a RCM of the receiving device in accordance with the first mode of operation, and in response to determining to transmit WUR beacons periodically, transmitting, by the transmitting device, WUR beacons periodically, and waking up, by the transmitting device, the RCM of the receiving device in accordance with the second mode of operation.

Optionally, in any of the preceding embodiments, an embodiment wherein determining whether to transmit WUR beacons periodically comprises determining, by the transmitting device, to stop transmitting WUR beacons when determining a presence of a security threat, and determining, by the transmitting device, to transmit WUR beacons periodically when determining an absence of the security threat.

Optionally, in any of the preceding embodiments, an embodiment wherein the security threat comprises a WUR beacon containing an erroneous clock information causing the transmitting device and the receiving device to be out of synchronization in time.

Optionally, in any of the preceding embodiments, an embodiment wherein the method further comprises in response to determining not to transmit any WUR beacon, transmitting, by the transmitting device, a first information to convey that the transmitting device does not transmit any WUR beacon, and in response to determining to transmit WUR beacons periodically, transmitting, by the transmitting device, a second information to convey that the transmitting device transmits WUR beacons periodically.

Optionally, in any of the preceding embodiments, an embodiment wherein the first information is one of a WUR beacon interval field set to a pre-specified value or a first WUR packet including a first pre-specified identifier conveying that the transmitting device does not transmit any WUR beacon, and wherein the second information is one of the WUR beacon interval field set to a value unequal to the pre-specified value, or a second WUR packet including a second pre-specified identifier conveying that the transmitting device transmits WUR beacons periodically.

Optionally, in any of the preceding embodiments, an embodiment wherein the first mode of operation is one of an always-on mode or an asynchronous duty-cycled mode, and wherein the second mode of operation is one of the always-on mode, the asynchronous duty-cycled mode, or a synchronous duty-cycled mode.

Optionally, in any of the preceding embodiments, an embodiment wherein the always-on mode is a mode in accordance with which the transmitting device wakes up the receiving device by transmitting a wake-up packet at any time, wherein the asynchronous duty-cycled mode is a mode in accordance with which the transmitting device is unable to determine beginnings or endings of On periods, during which the WUR receiver of the receiving device is active, in accordance with a clock of the transmitting device, and based thereon, wakes up the receiving device by transmitting a specified number of the wake-up packets, the transmission meeting an interval criteria, and wherein the synchronous duty-cycled mode is a mode in accordance with which the transmitting device is able to determine the beginnings and the endings of the On periods, during which the WUR receiver of the receiving device is active, in accordance with the clock of the transmitting device, and based thereon, wakes up the receiving device by transmitting the wake-up packet during one of the On periods.

Optionally, in any of the preceding embodiments, an embodiment wherein the information conveying the always-on mode comprises one of a first value of a mode subfield set in accordance with the always-on mode, a zero value of an off duration subfield, or a duty-cycle duration subfield set equal to an on duration subfield, wherein the information conveying the asynchronous duty-cycled mode comprises a second value of the on duration subfield and one of a third value of the off duration subfield set greater than zero or a fourth value of the duty-cycle duration subfield set greater than the second value, and wherein the information conveying the synchronous duty-cycled mode comprises a fifth value of the on duration subfield, a sixth value of an offset subfield, and one of a seventh value of the off duration subfield set greater than zero or an eighth value of the duty-cycle duration subfield set greater than the fifth value.

In accordance with an example embodiment, a receiving device is provided. The receiving device includes one or more processors, and a computer readable storage medium storing programming for execution by the one or more processors. The programming including instructions to receive, from a transmitting device, information conveying a first mode of operation and a second mode of operation, wherein the first mode of operation is used for operating a WUR receiver of the receiving device when the transmitting device does not transmit any WUR beacons and the second mode of operation is used for operating the WUR receiver of the receiving device when the transmitting device transmits WUR beacons periodically, determine that the transmitting device does not transmit any WUR beacons, and based thereon, operate the WUR receiver of the receiving device in accordance with the first mode of operation.

Optionally, in any of the preceding embodiments, an embodiment wherein the programming includes instructions to configure the receiving device to receive, from the transmitting device, one of a WUR beacon interval field set to a pre-specified value, a WUR packet including a pre-specified identifier conveying that the transmitting device does not transmit any WUR beacon, or no WUR beacons within a specified time period, wherein the WUR beacon interval field is included in a frame received by a RCM of the receiving device, and wherein the WUR packet is received by the WUR receiver of the receiving device.

Optionally, in any of the preceding embodiments, an embodiment wherein the programming includes instructions to configure the receiving device to determine that the transmitting device transmits WUR beacons periodically, and based thereon, operate the WUR receiver of the receiving device in accordance with the second mode of operation, wherein the programming includes instructions to configure the receiving device to receive, from the transmitting device, one of a WUR beacon interval field set to a value unequal to a pre-specified value, a WUR packet including a pre-specified identifier conveying that the transmitting device transmits WUR beacons periodically, or a specified number of WUR beacons within a specified time period, wherein the WUR beacon interval field is included in a frame received by a RCM of the receiving device, wherein the WUR packet or the specified number of WUR beacons are received by the WUR receiver of the receiving device.

Optionally, in any of the preceding embodiments, an embodiment wherein the first mode of operation is one of an always-on mode or an asynchronous duty-cycled mode, wherein the second mode of operation is one of the always-on mode, the asynchronous duty-cycled mode, or a synchronous duty-cycled mode, wherein the always-on mode is a mode in which the WUR receiver of the receiving device is active as long as a RCM of the receiving device is operating in a power-saving mode, wherein the asynchronous duty-cycled mode is a mode in which the WUR receiver of the receiving device is active during On periods of repeating duty cycle periods and inactive during Off periods of the repeating duty cycle periods as long as the RCM of the receiving device is operating in the power-saving mode, beginnings and endings of the On periods of the repeating duty cycle periods are determined in accordance with a clock of the WUR receiver of the receiving device, and the clock of the WUR receiver of the receiving device is unsynchronized with a clock of the transmitting device, and wherein the synchronous duty-cycled mode is a mode in which the WUR receiver of the receiving device is active during the On periods of the repeating duty cycle periods and inactive during the Off periods of the repeating duty cycle periods as long as the RCM of the receiving device is operating in the power-saving mode, the beginnings and the endings of the On periods of the repeating duty cycle periods are determined in accordance with the clock of the WUR receiver of the receiving device, and the clock of the WUR receiver of the receiving device is synchronized with the clock of the transmitting device.

In accordance with an example embodiment, a transmitting device is provided. The transmitting device includes one or more processors, and a computer readable storage medium storing programming for execution by the one or more processors. The programming including instructions to configure the transmitting device to transmit information conveying a first mode of operation and a second mode of operation with a receiving device, wherein the first mode of operation is used for operating a WUR receiver of the receiving device when the transmitting device does not transmit any WUR beacons and the second mode of operation is used for operating the WUR receiver of the receiving device when the transmitting device transmits WUR beacons periodically, determine whether to transmit WUR beacons periodically, wherein each of the WUR beacons includes a clock information of the transmitting device, in response to determining not to transmit any WUR beacons, the programming including instructions to configure the transmitting device to stop transmission of any pending WUR beacons, and wake up a RCM of the receiving device in accordance with the first mode of operation, and in response to determining to transmit WUR beacons periodically, the programming including instructions to configure the transmitting device to transmit WUR beacons periodically, and wake up the RCM of the receiving device in accordance with the second mode of operation.

Optionally, in any of the preceding embodiments, an embodiment wherein the programming includes instructions to configure the transmitting device to stop transmission of WUR beacons when determining a presence of a security threat, and to transmit WUR beacons periodically when determining an absence of the security threat.

Optionally, in any of the preceding embodiments, an embodiment wherein the security threat comprises a WUR beacon containing an erroneous clock information causing the transmitting device and the receiving device to be out of synchronization in time.

Optionally, in any of the preceding embodiments, an embodiment wherein the programming includes instructions to configure the transmitting device to, in response to determining not to transmit any WUR beacon, transmit a first information conveying that the transmitting device does not transmit any WUR beacon, and in response to determining to transmit WUR beacons periodically, transmit a second information conveying that the transmitting device transmits WUR beacons periodically.

Optionally, in any of the preceding embodiments, an embodiment wherein the first information is one of a WUR beacon interval field set to a pre-specified value or a first WUR packet including a first pre-specified identifier conveying that the transmitting device does not transmit any WUR beacon, and wherein the second information is one of the WUR beacon interval field set to a value unequal to the pre-specified value, or a second WUR packet including a second pre-specified identifier conveying that the transmitting device transmits WUR beacons periodically.

Optionally, in any of the preceding embodiments, an embodiment wherein the first mode of operation is one of an always-on mode or an asynchronous duty-cycled mode, wherein the second mode of operation is one of the always-on mode, the asynchronous duty-cycled mode, or a synchronous duty-cycled mode, wherein the always-on mode is a mode in accordance with which the transmitting device wakes up the receiving device by transmitting a wake-up packet at any time, wherein the asynchronous duty-cycled mode is a mode in accordance with which the transmitting device is unable to determine beginnings or endings of On periods, during which the WUR receiver of the receiving device is active, in accordance with a clock of the transmitting device, and based thereon, wakes up the receiving device by transmitting a specified number of the wake-up packets, the transmission meeting an interval criteria, and wherein the synchronous duty-cycled mode is a mode in accordance with which the transmitting device is able to determine the beginnings and the endings of the On periods, during which the WUR receiver of the receiving device is active, in accordance with the clock of the transmitting device, and based thereon, wakes up the receiving device by transmitting the wake-up packet during one of the On periods.

In accordance with an example embodiment, a method for waking up a receiving device operating in a duty-cycled mode is provided. The method includes scheduling, by a transmitting device, WUPs in a sequence of WUPs for transmission at a nominal interval between beginnings of any two successive WUPs in the sequence of WUPs, and transmitting, by the transmitting device, the sequence of WUPs, the transmitting comprising for each WUP in the sequence of WUPs, detecting, by the transmitting device, that the transmitting device is able to transmit the WUP at a transmission time associated with the WUP, and based thereon, transmitting, by the transmitting device, the WUP, and detecting, by the transmitting device, that the transmitting device is unable to transmit the WUP at the transmission time associated with the WUP, and based thereon, deferring, by the transmitting device, the transmission time associated with the WUP by a multiple of a duty-cycle period, and rescheduling, by the transmitting device, the WUP for transmission in accordance with the deferred transmission time.

Optionally, in any of the preceding embodiments, an embodiment wherein the method further comprises receiving, by the transmitting device, information conveying that the receiving device has been woken up, and based thereon, stopping, by the transmitting device, the transmitting the sequence of WUPs.

Optionally, in any of the preceding embodiments, an embodiment wherein each WUP includes an identifier of the receiving device.

Optionally, in any of the preceding embodiments, an embodiment wherein the method further comprises determining, by the transmitting device, a number of WUPs in the sequence of WUPs to be transmitted to wake up the receiving device, and determining, by the transmitting device, the nominal interval between the beginnings of any two successive WUPs in the sequence of WUPs.

Optionally, in any of the preceding embodiments, an embodiment wherein the nominal interval between the beginnings of any two successive WUPs to be transmitted is less than or equal to a difference between a duration of an "On" period and a duration of the WUP.

Optionally, in any of the preceding embodiments, an embodiment wherein the number of WUPs is expressible as $$N \geq \frac{P_{OFF} + WD}{WI} + 1 = \frac{P_{OFF} + WD}{P_{ON} - WD} + 1,$$

where N is the number of WUPs, $P_{OFF}$ is a duration of an "Off" period, $P_{ON}$ is a duration of an "On" period, WD is a duration of the WUP, and WI is the interval between the beginnings of any two successive WUPs.

Optionally, in any of the preceding embodiments, an embodiment wherein the multiple is an integer multiple.

Optionally, in any of the preceding embodiments, an embodiment wherein deferring the transmission time associated with the WUP comprises adding the multiple of the duty-cycle period to the transmission time associated with the WUP.

In accordance with an example embodiment, a method for determining a mode of operation for a WUR receiver of a receiving device is provided. The method includes receiving, by the receiving device, a WUR beacon interval information from a transmitting device, and determining, by the receiving device, the mode of operation for the WUR receiver of the receiving device in accordance with the WUR beacon interval information.

Optionally, in any of the preceding embodiments, an embodiment wherein determining the mode of operation further comprises determining, by the receiving device, that the WUR beacon interval information conveys that the transmitting device does not transmit WUR beacons, and based thereon, operating in one of an always-on mode or an asynchronous duty-cycled mode, wherein the always-on mode is a mode in which the WUR receiver of the receiving device is active as long as a RCM of the receiving device is operating in a power-saving mode, and the asynchronous duty-cycled mode is a mode in which the WUR receiver of the receiving device is active during an On period of each duty cycle and inactive during an Off period of each duty cycle as long as the RCM of the receiving device is operating in the power-saving mode, wherein beginnings and endings of On periods of repeating duty cycles are determined in accordance with a clock of the WUR receiver of the receiving device that is unsynchronized with a clock of the transmitting device.

Optionally, in any of the preceding embodiments, an embodiment wherein the WUR beacon interval information is equal to a pre-specified value conveying that the transmitting device does not transmit WUR beacons.

Optionally, in any of the preceding embodiments, an embodiment wherein determining the mode of operation further comprises determining, by the receiving device, that the WUR beacon interval information conveys that the transmitting device periodically transmits WUR beacons, and based thereon, operating in one of an always-on mode, an asynchronous duty-cycled mode, or a synchronous duty-cycled mode, wherein the always-on mode is a mode in which the WUR receiver of the receiving device is active as long as a RCM of the receiving device is operating in a power-saving mode, the asynchronous duty-cycled mode is a mode in which the WUR receiver of the receiving device is active during an On period of each duty cycle and inactive during an Off period of each duty cycle as long as the RCM of the receiving device is operating in the power-saving mode, wherein beginnings and endings of On periods of repeating duty cycles are determined in accordance with a clock of the WUR receiver of the receiving device that is unsynchronized with a clock of the transmitting device, and the synchronous duty-cycled mode is a mode in which the WUR receiver of the receiving device is active during the On period of each duty cycle and inactive during the Off period of each duty cycle as long as the RCM of the receiving device is operating in the power-saving mode, wherein the beginnings and the endings of the On periods of the repeating duty cycles are determined in accordance with the clock of the WUR receiver of the receiving device that is synchronized with the clock of the transmitting device.

Optionally, in any of the preceding embodiments, an embodiment wherein the WUR beacon interval information is unequal to a pre-specified value, the pre-specified value conveying that the transmitting device does not transmit WUR beacons.

In accordance with an example embodiment, a method for determining a mode of operation for a WUR receiver of a receiving device is provided. The method includes detecting, by the receiving device, a change in WUR Beacon transmissions, determining, by the receiving device, a first mode of operation in accordance with a previous configuration associated with the change in WUR Beacon transmissions, and operating, by the receiving device, the WUR receiver of the receiving device in accordance with the first mode of operations.

Optionally, in any of the preceding embodiments, an embodiment wherein the WUR Beacon includes a clock information of a transmitting device, wherein the clock information is used for synchronizing a clock of the WUR receiver with a clock of the transmitting device.

Optionally, in any of the preceding embodiments, an embodiment wherein detecting the change in WUR Beacon transmissions comprises receiving, by the receiving device, with the WUR receiver of the receiving device, a special packet announcing the change in WUR Beacon transmissions.

Optionally, in any of the preceding embodiments, an embodiment wherein detecting the change in WUR Beacon transmissions comprises being unable to detect WUR Beacons with the WUR receiver of the receiving device for a specified time period.

Optionally, in any of the preceding embodiments, an embodiment wherein the method further comprises configuring, by the receiving device, with a transmitting device, using a radio communications module of the receiving device, a second mode of operation to be retrieved as the first mode of operation when the change in WUR Beacon transmissions is detected, wherein the radio communications module is active.

Optionally, in any of the preceding embodiments, an embodiment wherein the WUR receiver of the receiving device operates in a third mode of operation before the change in WUR Beacon transmissions is detected.

In accordance with an example embodiment, a non-transitory computer-readable medium storing programming for execution by one or more processors is provided. The programming including instructions to schedule WUPs in a sequence of WUPs for transmission at a nominal interval between beginnings of any two successive WUPs in the sequence of WUPs, and transmit the sequence of WUPs. The programming includes instructions to, for each WUP in the sequence of WUPs, detect that the transmitting device is unable to transmit the WUP at a transmission time associated with the WUP, and based thereon, defer the transmission time associated with the WUP by a multiple of a duty-cycle period, and reschedule the WUP for transmission in accordance with the deferred transmission time.

Optionally, in any of the preceding embodiments, an embodiment wherein the programming includes instructions to configure the transmitting device to, when the transmitting device has received information conveying that a receiving device has been woken-up, stop the transmitting the sequence of WUPs.

Optionally, in any of the preceding embodiments, an embodiment wherein the programming includes instructions to configure the transmitting device to determine a number of WUPs in the sequence of WUPs to be transmitted to wake up a receiving device, and determine the nominal interval between the beginnings of any two successive WUPs in the sequence of WUPs.

Optionally, in any of the preceding embodiments, an embodiment wherein the programming includes instructions to configure the transmitting device to add the multiple of the duty-cycle period to the transmission time associated with the deferred WUP.

In accordance with an example embodiment, a transmitting device adapted to waking up a receiving device operating in a duty-cycled mode is provided. The transmitting device includes one or more processors, and a computer readable storage medium storing programming for execution by the one or more processors. The programming including instructions to configure the transmitting device to schedule WUPs in a sequence of WUPs for transmission at a nominal interval between beginnings of any two successive WUPs in the sequence of WUPs, and transmit the sequence of WUPs. The programming includes instructions to, for each WUP in the sequence of WUPs, detect that the transmitting device is unable to transmit the WUP at a transmission time associated with the WUP, and based thereon, defer the transmission time associated with the WUP by a multiple of a duty-cycle period, and reschedule the WUP for transmission in accordance with the deferred transmission time.

Optionally, in any of the preceding embodiments, an embodiment wherein the programming includes instructions to configure the transmitting device to receive information conveying that the receiving device has been woken up, and based thereon, stopping, by the transmitting device, the transmitting the sequence of WUPs.

Optionally, in any of the preceding embodiments, an embodiment wherein the programming includes instructions to configure the transmitting device to determine a number of WUPs in the sequence of WUPs to be transmitted to wake up the receiving device, and determine the nominal interval between the beginnings of any two successive WUPs in the sequence of WUPs.

Optionally, in any of the preceding embodiments, an embodiment wherein the nominal interval between the beginnings of any two successive WUPs to be transmitted is less than or equal to a difference between a duration of an "On" period and a duration of the WUP.

Optionally, in any of the preceding embodiments, an embodiment wherein the number of WUPs is expressible as $$N \geq \frac{P_{OFF} + WD}{WI} + 1 = \frac{P_{OFF} + WD}{P_{ON} - WD} + 1,$$

where N is the number of WUPs, $P_{OFF}$ is a duration of an "Off" period, $P_{ON}$ is a duration of an "On" period, WD is a duration of the WUP, and WI is the interval between the beginnings of any two successive WUPs.

Optionally, in any of the preceding embodiments, an embodiment wherein the programming includes instructions to configure the transmitting device to add the multiple of the duty-cycle period to the transmission time associated with the deferred WUP.

In accordance with an example embodiment, a receiving device adapted to determine a mode of operation for a WUR receiver of the receiving device is provided. The receiving device includes one or more processors, and a computer readable storage medium storing programming for execution by the one or more processors. The programming including instructions to configure the receiving device to receive a WUR beacon interval information from a transmitting device, and determine the mode of operation for the WUR receiver of the receiving device in accordance with the WUR beacon interval information.

Optionally, in any of the preceding embodiments, an embodiment wherein the programming includes instructions to configure the receiving device to determine that the WUR beacon interval information conveys that the transmitting device does not transmit WUR beacons, and based thereon, operate in one of an always-on mode or an asynchronous duty-cycle mode, wherein the always-on mode is a mode in which the WUR receiver of the receiving device is active as long as a RCM of the receiving device is inactive, and the asynchronous duty-cycled mode is a mode in which the WUR receiver of the receiving device is active during an On period of each duty cycle and inactive during an Off period of each duty cycle as long as the RCM of the receiving device is inactive, wherein beginnings and endings of On periods of repeating duty cycles are determined in accordance with a clock of the WUR receiver of the receiving device that is unsynchronized with a clock of the transmitting device.

Optionally, in any of the preceding embodiments, an embodiment wherein the programming includes instructions to configure the receiving device to determine that the WUR beacon interval information conveys that the transmitting device periodically transmits WUR beacons, and based thereon, operate in one of an always-on mode, an asynchronous duty-cycle mode, or a synchronous duty-cycle mode, wherein the always-on mode is a mode in which the WUR receiver of the receiving device is active as long as a RCM of the receiving device is operating in a power-saving mode, the asynchronous duty-cycled mode is a mode in which the WUR receiver of the receiving device is active during an On period of each duty cycle and inactive during an Off period of each duty cycle as long as the RCM of the receiving device is operating in the power-saving mode, wherein beginnings and endings of On periods of repeating duty cycles are determined in accordance with a clock of the WUR receiver of the receiving device that is unsynchronized with a clock of the transmitting device, wherein the synchronous duty-cycled mode is a mode in which the WUR receiver of the receiving device is active during the On period of the each duty cycle and inactive during the Off period of the each duty cycle as long as the RCM of the receiving device is inactive, wherein the beginnings and the endings of the On periods of the repeating duty cycles are determined in accordance with the clock of the WUR receiver of the receiving device that is synchronized with the clock of the transmitting device.

Optionally, in any of the preceding embodiments, an embodiment wherein the WUR beacon interval information conveys that the transmitting device does not transmit WUR beacons when the WUR beacon interval information is equal to a pre-specified value and conveys that the transmitting device transmits WUR beacons periodically when the WUR beacon interval information is unequal to the pre-specified value.

In accordance with an example embodiment, a receiving device adapted to determine a mode of operation for a WUR receiver of the receiving device is provided. The receiving device includes one or more processors, and a computer readable storage medium storing programming for execution by the one or more processors. The programming including instructions to configure the receiving device to detect a change in WUR Beacon transmissions, determine a first mode of operation in accordance with a previous configuration and the change in WUR Beacon transmissions, and operate the WUR receiver of the receiving device in accordance with the first mode of operation.

Optionally, in any of the preceding embodiments, an embodiment wherein the WUR Beacon includes a clock information of a transmitting device, wherein the clock information is used for synchronizing a clock of the WUR receiver with the clock of the transmitting device.

Optionally, in any of the preceding embodiments, an embodiment wherein the programming includes instructions to configure the receiving device to receive with the WUR receiver of the receiving device, a special packet announcing the change in WUR Beacon transmissions.

Optionally, in any of the preceding embodiments, an embodiment wherein the programming includes instructions to configure the receiving device to be unable to detect WUR Beacons with the WUR receiver of the receiving device for a specified time period.

Optionally, in any of the preceding embodiments, an embodiment wherein the programming includes instructions to configure the receiving device to retrieve the previous configuration associated with the change in WUR Beacon transmissions.

Optionally, in any of the preceding embodiments, an embodiment wherein the programming includes instructions to configure the receiving device to configure with a transmitting device, using a radio communications module of the receiving device while the radio communications module is active, a second mode of operation to be retrieved as the first mode of operation when the change in WUR Beacon transmissions is detected.

Optionally, in any of the preceding embodiments, an embodiment wherein the programming includes instructions to operate the WUR receiver of the receiving device in a third mode of operation before the change in WUR Beacon transmissions is detected.

In accordance with an example embodiment, a transmitting device is provided. The transmitting device includes one or more processors, and a computer readable storage medium storing programming for execution by the one or more processors. The programming including instructions to configure the transmitting device to stop a transmission of WUR Beacons, and wake up a receiving device in accordance with a first mode of operation previously configured with the receiving device, the first mode of operation associated with operations without the transmission of WUR Beacons.

Optionally, in any of the preceding embodiments, an embodiment wherein the programming includes instructions to configure the transmitting device to stop the transmission and wake up the receiving device in response to determining a presence of a security threat.

Optionally, in any of the preceding embodiments, an embodiment wherein the programming includes instructions to configure the transmitting device to configure with the receiving device using a radio communications module of the receiving device while the radio communications module is active, a second mode of operation that the transmitting device will use as the first mode of operation for waking up the receiving device when the transmitting device stops transmitting the WUR Beacons.

Optionally, in any of the preceding embodiments, an embodiment wherein the programming includes instructions to configure the transmitting device to detect a faked WUR Beacon containing erroneous clock information.

Optionally, in any of the preceding embodiments, an embodiment wherein the programming includes instructions to configure the transmitting device to receive a report of detection of faked WUR Beacon containing erroneous clock information.

Optionally, in any of the preceding embodiments, an embodiment wherein the programming includes instructions to configure the transmitting device to convey the stopping of the transmission of WUR Beacons.

Optionally, in any of the preceding embodiments, an embodiment wherein the programming includes instructions to configure the transmitting device to transmit a special WUR packet announcing the stopping of the transmission of WUR Beacons.

Optionally, in any of the preceding embodiments, an embodiment wherein the programming includes instructions to configure the transmitting device to transmit a frame including a WUR Beacon Interval information set to a pre-specified value conveying that the transmitting device doesn't transmit WUR Beacons.

Optionally, in any of the preceding embodiments, an embodiment wherein the programming includes instructions to configure the transmitting device to transmit WUR Beacons periodically, convey operations of transmitting WUR Beacons, and wake up a receiving device in accordance with a third mode of operation previously configured with the receiving device associated with the operations of transmitting WUR Beacons.

Optionally, in any of the preceding embodiments, an embodiment wherein the instructions to configure the transmitting device to transmit WUR Beacons periodically, convey operations of transmitting WUR Beacons, and wake up a receiving device are performed in response to an absence of the security threat.

Optionally, in any of the preceding embodiments, an embodiment wherein the programming includes instructions to configure the transmitting device to detect an absence of faked WUR Beacon containing erroneous clock information for a specified time period, and receive no reports of detection of faked WUR Beacon containing erroneous clock information for the specified time period.

In accordance with an example embodiment, a method for operating a transmitting device is provided. The method includes stopping, by the transmitting device, a transmission of WUR Beacons, and waking up, by the transmitting device, a receiving device in accordance with a first mode of operation previously configured with the receiving device, the first mode of operation associated with operations without the transmission of WUR Beacons.

Optionally, in any of the preceding embodiments, an embodiment wherein stopping the transmission and waking up the receiving device are performed in response to determining a presence of a security threat.

Optionally, in any of the preceding embodiments, an embodiment further comprising configuring, by the transmitting device, with the receiving device using a radio communications module of the receiving device while the radio communications module is active, a second mode of operation that the transmitting device will use as the first mode of operation for waking up the receiving device when the transmitting device stops transmitting the WUR Beacons.

Optionally, in any of the preceding embodiments, an embodiment wherein determining the presence of the security threat comprises detecting, by the transmitting device, a faked WUR Beacon containing erroneous clock information.

Optionally, in any of the preceding embodiments, an embodiment wherein determining the presence of the security threat comprises receiving, by the transmitting device, a report of detection of faked WUR Beacon containing erroneous clock information.

Optionally, in any of the preceding embodiments, an embodiment further comprising conveying, by the transmitting device, the stopping of the transmission of WUR Beacons.

Optionally, in any of the preceding embodiments, an embodiment wherein conveying the stopping comprises transmitting, by the transmitting device, a special WUR packet announcing the stopping of the transmission of WUR Beacons.

Optionally, in any of the preceding embodiments, an embodiment wherein conveying the stopping comprises transmitting, by the transmitting device, a frame including a WUR Beacon Interval information set to a pre-specified value.

Optionally, in any of the preceding embodiments, an embodiment further comprising transmitting, by the transmitting device, WUR Beacons periodically, conveying, by the transmitting device, operations of transmitting WUR Beacons, and waking up, by the transmitting device, a receiving device in accordance with a third mode of operation previously configured with the receiving device associated with the operations of transmitting WUR Beacons.

Optionally, in any of the preceding embodiments, an embodiment wherein transmitting the WUR Beacons, conveying the operations of transmitting WUR Beacons, and waking up are performed in response to determining an absence of the security threat.

Optionally, in any of the preceding embodiments, an embodiment wherein determining the absence of the security threat comprises detecting, by the transmitting device, an absence of faked WUR Beacon containing erroneous clock information for a specified time period, and receiving, by the transmitting device, no reports of detection of faked WUR Beacon containing erroneous clock information for the specified time period.

Practice of the foregoing embodiments enables the waking up a sleeping device with a wake-up receiver of the sleeping device operating with a duty cycle of "On" and "Off". The waking up of the sleeping device by a transmitting device occurs without the transmitting device maintaining clock synchronization with the sleeping device or periodically transmitting synchronization beacons to maintain the clock synchronization. The wake-up receiver of the sleeping device is able to further reduce its power consumption by periodically operating in a power-reduced state during the "Off" periods without the need of maintaining the clock synchronization with the transmitting device. Therefore, the wake-up receiver of the sleeping device is not subject to malicious attacks on the clock synchronization (e.g., by an attacker faking a synchronization beacon packet with erroneous timing information).

Practice of the foregoing embodiments enables the selection of a mode from or the switching among various modes of wake-up operation described herein. For example, when detecting a security threat, the transmitting device may force one or more receiving devices to operate in an always-on mode or an asynchronous duty-cycled mode by stopping periodically transmitting beacon packets, wherein the beacon packets contain timing information of the transmitting device for maintaining a clock synchronization between the transmitting device and the one or more receiving devices. For another example, when detecting a stop of a security threat, the transmitting device may periodically transmitting beacon packets, and thereby causing the one or more receiving devices to operate in one of the always-on mode, a synchronous duty-cycled mode, and the asynchronous duty-cycled mode.

BRIEF DESCRIPTION OF THE DRAWINGS

For a more complete understanding of the present disclosure, and the advantages thereof, reference is now made to the following descriptions taken in conjunction with the accompanying drawings, in which.

DETAILED DESCRIPTION OF ILLUSTRATIVE EMBODIMENTS

The making and using of the disclosed embodiments are discussed in detail below. It should be appreciated, however, that the present disclosure provides many applicable inventive concepts that can be embodied in a wide variety of specific contexts. The specific embodiments discussed are merely illustrative of specific ways to make and use the embodiments, and do not limit the scope of the disclosure.

Figure 1:
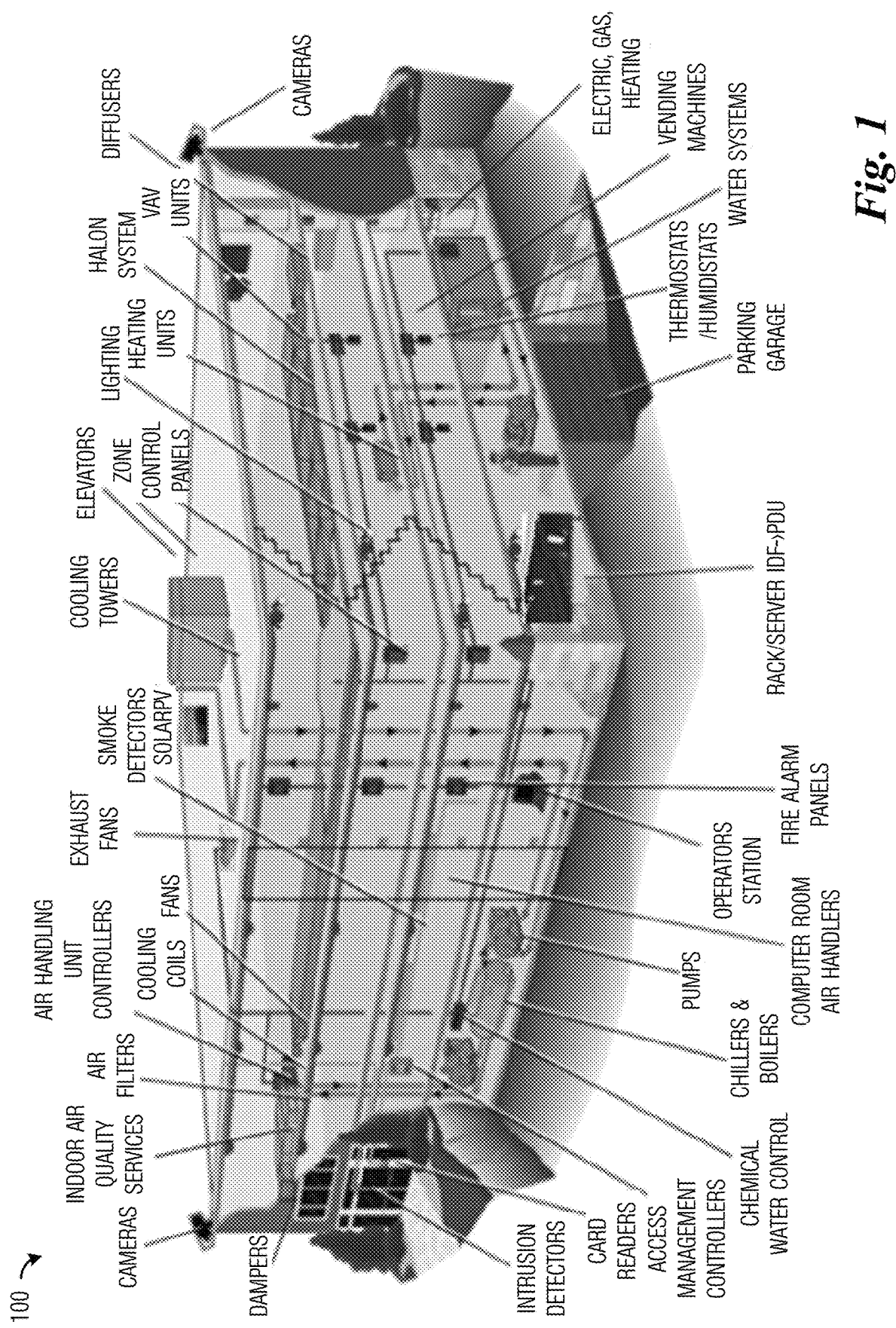
FIG. 1 illustrates an example smart building highlighting various sensors and monitoring devices.

The Internet of Things (IoT) is a suite of technologies and applications that enable devices and locations to generate all kinds of information—and to connect those devices and locations for instant data analysis and, ideally, "smart" actions. For example, the IoT promises to facilitate smart buildings by uniting a variety of sensors and facility equipments into an integrated whole. FIG. 1 illustrates an example smart building 100 highlighting various sensors and monitoring devices, which are deployed in or around a commercial or residential building to monitor various conditions such as lighting, temperature, air quality, fire, smoke, carbon monoxide (CO) gas, security, intrusion, etc., and various facility equipments such as lighting equipments, heating or cooling equipments, air ventilation equipments, fire alarms, sprinkling system, security alarms, information systems, etc., which are deployed to control the various fore-mentioned conditions in order to provide a healthy, comfort, and safe environment for people in the building and to do so in an energy-efficient manner. The various sensors and monitoring devices communicate with the various facility equipments, either directly or via a communications and control center, by using data communications technologies. For example, one or more data access points may be deployed throughout a smart building, where the data access points are connected to a center of communications, data analysis, and control, typically via wired connections such as cables. The data access points are also connected to the various sensors and monitoring devices, as well as communications modules on the various facility equipments, typically via radio communications (such as Wi-Fi, BlueTooth, and ZigBee), so that the various sensors and equipments may be deployed anywhere in the building at a later time without the need to alter the previous cable-wiring. Many of these sensors and the communications modules operate on battery power.

The IEEE Standard 802.11-2016 is a set of media access control (MAC) layer and physical (PHY) layer specifications for implementing wireless local area network (LAN) or wireless fidelity (Wi-Fi) communication in the 2.4, 5, and 60 GHz frequency bands. A basic service set (BSS) provides the basic building-block of an 802.11 wireless LAN. In an infrastructure mode of 802.11, a single access point (AP) together with all associated stations (STAs) form a BSS. The AP acts as a master to control the STAs within that BSS. A station (STA) may also be referred to as a device, a user equipment, a terminal, a node, and so forth. An AP may also be referred to as a network controller, a base station, a wireless router (due to a router co-located with the AP, the router providing a connection to a network), and so on. The simplest infrastructure BSS consists of one AP and one STA.

Figure 2:
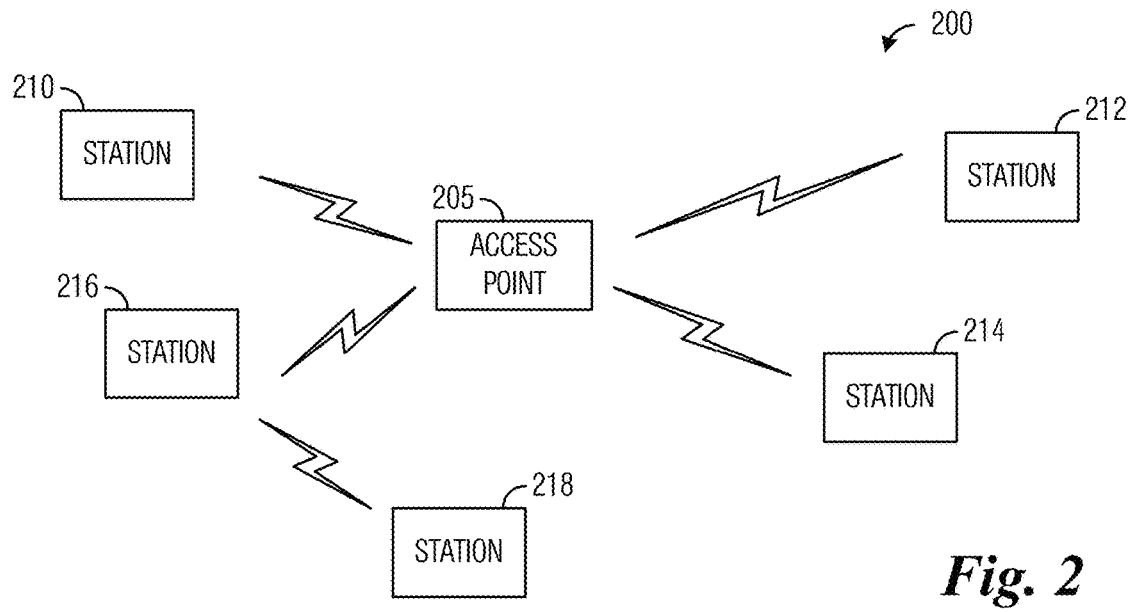
FIG. 2 illustrates an example communications system consisting of an infrastructure BSS.

FIG. 2 shows an example communications system 200 consisting of an infrastructure BSS. Communications system 200 includes an access point (AP) 205 that is serving a plurality of stations, such as stations 210, 212, 214, 216, and 218. Access point 205 controls certain aspects (such as radio frequency channel, transmission power limit, authentication, security, etc.) of communications with or among its associated stations. Generally speaking, in communications system 200, wireless resources for both uplink (station to access point) and downlink (access point to station) transmissions are accessed by transmitters based on a distributed contention mechanism commonly referred to as carrier sensing multiple access with collision avoidance (CSMA/CA). However, access point 205 still may influence the resource allocation by assigning different access priorities to stations or traffic types, and when succeeding in channel contention, by explicitly allocating certain time periods for certain stations or traffics or for special purposes, such as Quiet Period during which time no transmitter may transmit.

Figure 3:
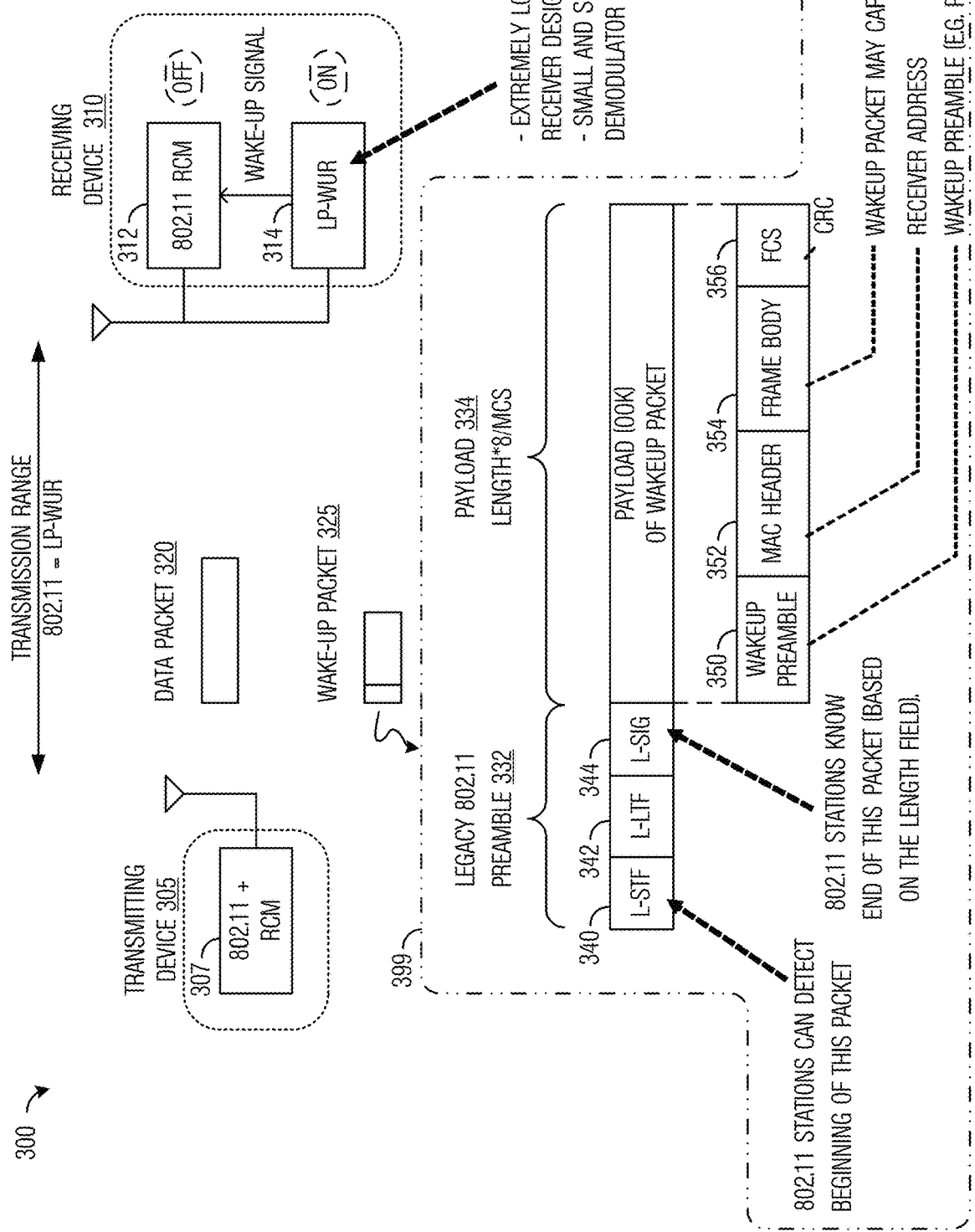
FIG. 3 illustrates an example IEEE 802.11 communications system with a low-power wake-up radio according to example embodiments described herein.

FIG. 3 illustrates an example IEEE 802.11 communications system 300 with a low-power wake-up radio (LP-WUR). Communications system 300 includes a transmitting device 305 and a receiving device 310. Examples of transmitting device 305 may include an AP attempting to wake up a sleeping STA associated with the AP, a STA attempting to wake up a sleeping AP serving the STA, and a STA operating in a peer-to-peer (P2P) communications mode and attempting to wake up a peer STA that is sleeping. Examples of receiving device 310 may include a sleeping STA served by an AP, a sleeping AP, a sleeping STA operating in the P2P communications mode. Transmitting device 305 includes, among other things, an enhanced 802.11 RCM (labeled "802.11+") 307. Enhanced 802.11 RCM 307 is capable of communications utilizing IEEE 802.11 standard signaling, as well as LP-WUR signaling, including the transmission of a wake-up packet. At least a payload portion of the wake-up packet may be transmitted over a much narrower channel bandwidth than the IEEE 802.11 standard signaling. For example, IEEE 802.11 standard signaling may be transmitted over a channel bandwidth of 20 MHz and the payload of the wake-up packet may be transmitted over a channel bandwidth of 5 MHz or less. A narrower bandwidth helps to reduce the cost and power consumption of an intended receiver, such as one in receiving device 310, which is very desirable for designing a LP-WUR. It is noted that in some places the term WUR refers to the wake-up radio technique as a whole, which comprises a wake-up packet, a first device transmitting the wake-up packet, a receiver of a second device receiving the wake-up packet, and the use of the wake-up packet to wake up an RCM of the second device from a sleep mode. In some other places, WUR just narrowly refers to the receiver of the second device that is configured to receive the wake-up packet. As related to the discussion presented herein, when discussing the wake-up receiver and not the wake-up radio technique as a whole, the term receiver is added after WUR.

Receiving device 310 includes, among other things, an 802.11 RCM 312 and a LP-WUR 314, wherein LP-WUR 314 comprises a wake-up receiver of receiving device 310. 802.11 RCM 312 is intended for communicating user data while LP-WUR 314 is not. Thus, LP-WUR 314 usually does not have a transmitter. LP-WUR 314 is present to assist in waking up 802.11 RCM 312 from a sleeping or OFF mode. In general, LP-WUR 314 is ON when 802.11 RCM 312 is OFF (e.g., in the sleeping mode). LP-WUR 314 comprises a memory (or register) designed to store a value provided by a processor associated with 802.11 RCM 312, a receiver designed to receive at least the payload of the wake-up packet, and a comparator designed to compare a value in the received payload with the value stored in the memory. The comparator generates a signal referred to as a wake-up interrupt when the received value matches with the stored value. LP-WUR 314 is coupled to 802.11 RCM 312 through a connection used for carrying the wake-up interrupt, which may be used by LP-WUR 314 to wake up 802.11 RCM 312 from the sleeping mode.

In computer science, an interrupt is a term used for a signal external to a processor that alerts the processor to a high-priority condition or event requiring the interruption of the current program the processor is executing. The processor responds by suspending its current activities and executing programs to deal with the event. The interruption may be temporary, and, after the execution of programs dealing with the event finishes, the processor may resume its current activities. For example, when there is no data communications for a while or when a sleep command is received, a processor associated with 802.11 RCM 312 may execute a program that places at least a major portion of the electronic circuits inside 802.11 RCM 312 into a sleeping mode, which may also be referred to as a power save mode or a power off mode. While the portion of the electronic circuits of 802.11 RCM 312 is in the sleeping mode, the capabilities of 802.11 RCM 312 is disabled to the extent that 802.11 RCM 312 is no longer capable of communications utilizing IEEE 802.11 standard signaling. The processor associated with 802.11 RCM 312 responds to the wake-up interrupt generated by LP-WUR 314 by powering up the electronic circuits inside 802.11 RCM 312 thereby resuming its capability to communicate utilizing IEEE 802.11 standard signaling. In general, when in the ON or active state, 802.11 RCM 312 will consume significantly greater power than LP-WUR 314, at least one or two orders of magnitude more power. An example target power consumption for LP-WUR 314 is less than 100 micro-watts while ON. The receiver of LP-WUR 314 has a narrow radio frequency (RF) bandwidth matching the bandwidth of the payload of the wake-up packet, 5 MHz or less than, for example, and has a reception range that is approximately equal to that of 802.11 RCMs.

When performing 802.11 communications, transmitting device 305 transmits data packets, such as data packet 320, to receiving device 310, where 802.11 RCM 312 receives and processes the data packet.

As shown in FIG. 3, receiving device 310 initially is in a reduced power state. One of the ways that receiving device 310 is able to reduce power consumption is to turn OFF 802.11 RCM 312 while keeping LP-WUR 314 ON. When receiving device 310 is in the reduced power state, 802.11 RCM 312 is OFF and receiving device 310 is unable to receive or process 802.11 data packets.

However, LP-WUR 314 remains ON and receiving device 310 is able to receive wake-up packets, such as wake-up packet 325. In a situation where transmitting device 305 has data to transmit to receiving device 310, but receiving device 310 is in the reduced power state, transmitting device 305 first transmits wake-up packet 325 to receiving device 310, e.g., using 802.11+ RCM 307. Wake-up packet 325 is received and processed by LP-WUR 314, which wakes up 802.11 RCM 312. Then, transmitting device 305 transmits data to receiving device 310 using 802.11+ RCM 307 and receiving device 310 receives the data using 802.11 RCM 312.

A highlight 399 provides a detailed view of an example wake-up packet, e.g., wake-up packet 325. The wake-up packet includes a preamble 332 and a payload 334. Preamble 332 is compliant to 802.11 technical standards and includes a Legacy short training field (L-STF) 340, a Legacy long training field (L-LTF) 342, and a Legacy SIGNAL field (L-SIG) 344. Payload 334 includes multiple fields, including a wake-up preamble 350, a medium access control (MAC) header (e.g., comprising a receiver MAC address or a WUR identifier (WUID) used for identifying the intended recipient) 352, a frame body 354, and a frame check sequence (FCS) 356. Wake-up preamble 350 contains a wake-up sequence. The wake-up sequence may be a pseudo-random number sequence, for example, possessing good auto-correlation properties, or simply a sequence of alternating "1010 . . . " bits, for another example, in order to assist LP-WUR receivers to acquire timing for sampling and detecting the remainder of payload 334. MAC header 352 contains an address or identifier (such as WUID) of a receiving device that wake-up packet 325 is intended to wake up. Frame body 354 may contain other information. FCS 356 includes a cyclic-redundancy check (CRC) for integrity checking wake-up packet 325. In order to maintain compatibility with 802.11 compliant devices in communications system 300, preamble 332 is an 802.11 legacy preamble transmitted over a channel bandwidth complaint with 802.11 standard signaling, such as 20 MHz.

Preamble 332 is not to be detected by the LP-WUR receivers, such as LP-WUR 314, because the receiver bandwidth of LP-WUR is usually insufficient to receive 802.11 legacy preambles, such as preamble 332. Instead, preamble 332 is intended for legacy 802.11 devices to prevent them from transmitting during the transmission of payload 334. A LENGTH subfield of L-SIG 344 in preamble 332 is used to convey information regarding the duration of payload 334. Payload 334 includes information that is modulated using a simple modulation scheme, such as On-Off-Keying (OOK) and is transmitting over a narrower channel bandwidth, such as 5 MHz or less. Therefore, legacy 802.11 devices normally won't be able to detect payload 334. However, legacy 802.11 devices are capable of detecting preamble 332 because preamble 332 fully complies with the bandwidth and signal format of legacy 802.11 standards. Thus, when receiving preamble 332, legacy 802.11 devices recognize that the channel will be busy for at least a duration as informed by the LENGTH value and thereafter suspend their attempts of transmitting during the transmission of payload 334, as if payload 334 complied with IEEE 802.11 standard signaling. It is noted that despite of the placement and the use of preamble 332 to protect payload 334, collision with wake-up packet 325 may still happen when both transmitting device 305 and an interfering device declare wining the channel contention at the same time, because there are a finite number of back-off time values within the contention window, from which transmitting device 305 and the interfering device can randomly choose as their back-off times, respectively.

Figure 4:
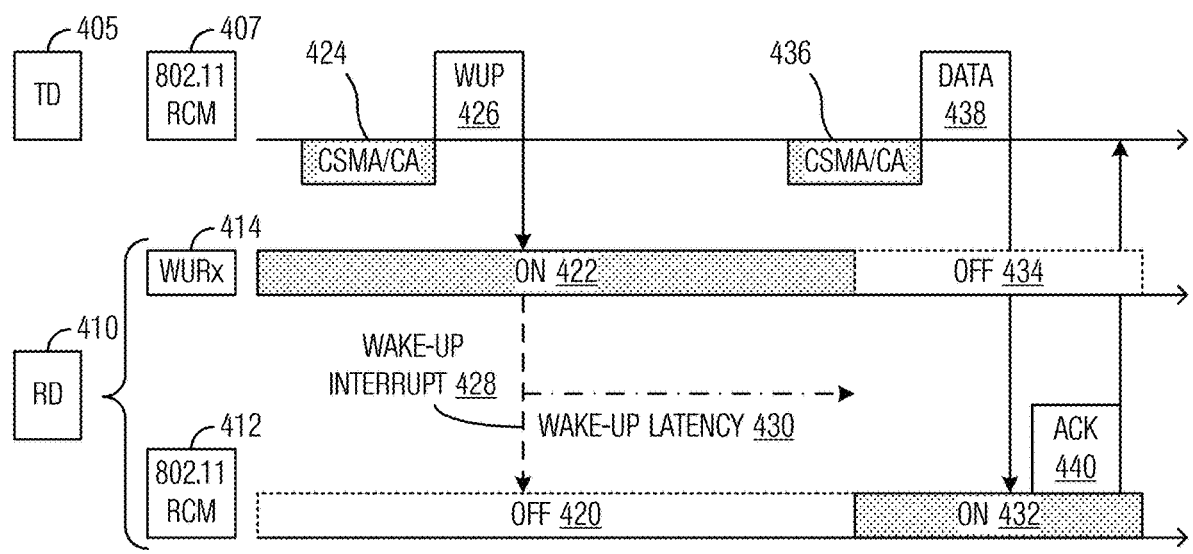
FIG. 4 illustrates an example sequence of events for waking up a communications station to receive a transmission.

FIG. 4 illustrates an example sequence of events, wherein a transmitting device 405 wakes up a receiving device 410 in order to transmit a short data to receiving device 410. It is noted that in the figures, transmitting device and receiving device are abbreviated as TD and RD, respectively. Transmitting device 405 includes, among other things, an enhanced 802.11 RCM 407. Enhanced 802.11 RCM 407 is capable of communications utilizing IEEE 802.11 standard signaling, as well as transmitting of a wake-up packet (e.g., wake-up packet 325). It is noted that wake-up packet is abbreviated as WUP in the figures. Receiving device 410 includes, among other things, an 802.11 RCM 412 and a WUR receiver (WURx) 414. As shown in FIG. 4, 802.11 RCM 412 is initially placed in a sleep mode (shown as dot-lined block OFF 420) and WURx 414 is active (shown as shaded block ON 422). 802.11 RCM 407 initiates a CSMA/CA based channel contention procedure (shown as shaded block CSMA/CA 424). 802.11 RCM 407 wins the channel contention and transmits the wake-up packet (shown as WUP 426). WURx 414 receives the wake-up packet and wakes up 802.11 RCM 412 with a wake-up interrupt signal 428. Then, it takes a period of time (shown as wake-up latency 430) for the electronics circuits in 802.11 RCM 412 to be powered up and become ready for transmitting and receiving conventional 802.11 signals. At the end of wake-up latency 430, 802.11 RCM 412 becomes active (shown as shaded block ON 432) and WURx 414 is sleeping (shown as dot-lined block OFF 434). 802.11 RCM 407 of transmitting device 405 initiates a second CSMA/CA based channel contention procedure (shown as shaded block CSMA/CA 436). 802.11 RCM 407 wins the second channel contention and transmits data to 802.11 RCM 412 (shown as data 438). 802.11 RCM 412 of receiving device 410 transmits an acknowledgement (ACK) frame back after correctly receiving the data (shown as ACK 440). The data exchange may continue until all data have been transmitted and received. Then, 802.11 RCM 412 may be placed back into the sleep mode. The IEEE 802.11 standards further specifies that when the data to be transmitted is large, the transmitting device should transmit a request-to-send (RTS) frame to the receiving device and subsequently receive a clear-to-send (CTS) frame back before transmitting the data in one or more data-ACK exchanges.

One way to ensure that the WURx of the receiving device can receive the wake-up packet transmitted by the transmitting device is to have the WURx of the receiving device operates in an always-on mode, wherein the WURx of the receiving device is always active and listening for wake-up packets as long as the RCM of the receiving device is sleeping. Because the transmitting device may send a wake-up packet to the WURx of the receiving device at any time to wake up the sleeping RCM of the receiving device, the transmitting device isn't required to maintain a synchronization between a clock of the transmitting device and a clock of the receiving device even if the clock of the receiving device drifts over time relative to the clock of the transmitting device.

Figure 5:
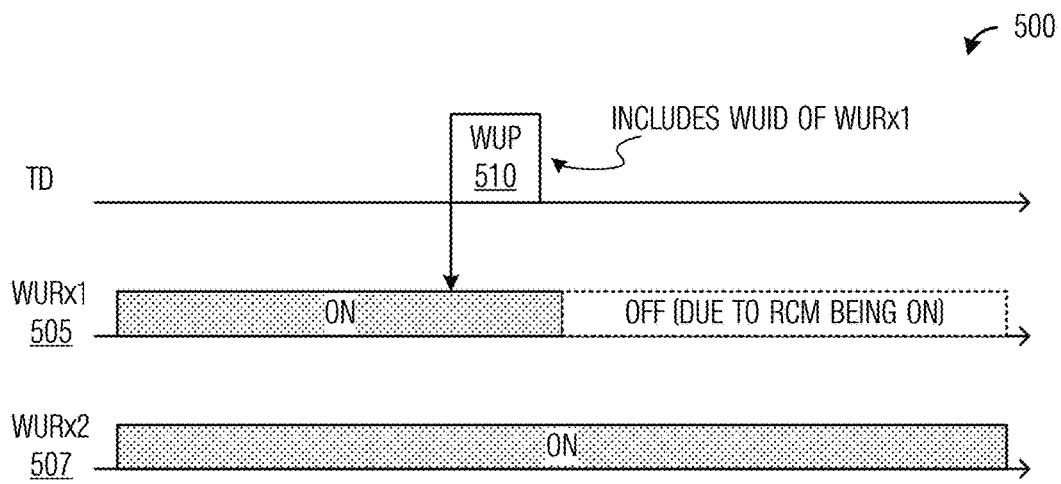
FIG. 5 illustrates a diagram of example wake-up operations in an always-on mode.

FIG. 5 illustrates a diagram 500 of example wake-up operations in the always-on mode. As shown in FIG. 5, two WURx (WURx1 505 and WURx2 507) of two receiving devices are active and operate in the always-one mode initially. For simplicity, the RCMs of these two receiving devices, which are associated with WURX1 505 and WURx2 507, respectively, are not shown in FIG. 5. WURx1 505 receives a wake-up packet 510 containing a wake-up identifier (WUID) of WURx1 505 and therefore wakes up the RCM associated with WURx1 505. Then, WURx1 505 is placed into a sleep (Off) mode after the RCM associated with WURx1 505 is woken up. Because WUP 510 does not include the WUID of WURx2 507, WURx2 507 remains on, and detecting for WUPs. Keeping the WURx of a receiving device always on while the RCM of the receiving device is sleeping may reduce latency for waking up the RCM of the receiving device, but also increases the power consumption of the receiving device due to the WURx being on all the time as long as the RCM of the receiving device is sleeping.

To further reduce power consumption, a WURx of a receiving device may operate in a duty-cycled mode when the RCM of the receiving device is sleeping or powered off. The duty-cycled mode is defined as an operating mode in which the WURx is active and detecting for packets complying with WUR signaling format during a fraction of every duty-cycle period. The fraction of the duty-cycle period when the WURx is active is referred to as an "On" period and the remaining fraction of the duty-cycle period is referred to as an "Off" period. The WURx may be placed in a power reduced state (such as sleeping) during the "Off" periods so that the power consumed by the WURx during the "Off" periods is negligible comparing to the power consumed during the "On" periods. For example, during the "Off" periods, the WURx may power down a majority of its electronics circuits (such as a radio frequency (RF) filter, a low noise amplifier, an energy envelop detector, a Manchester decoder, a comparator, a processor, etc.), while keeping a clock and a power management unit powered on in order to track time elapsed and to turn the majority of the electronic circuits back on before the next "On" period. Thus, generally speaking, a WURx operating in the duty-cycled mode is unable to receive the wake-up packets during the "Off" periods, therefore unable to wake up the RCM of the receiving device during the "Off" periods. Hence, the transmitting device must be able to transmit a wake-up packet during an "On" period of the WURx in order to wake up the receiving device.

There are two ways to ensure that a WURx operating in a duty-cycled mode can receive the wake-up packet. One is referred to as synchronous duty-cycled mode. The other is referred to as asynchronous duty-cycled mode.

Figure 6:
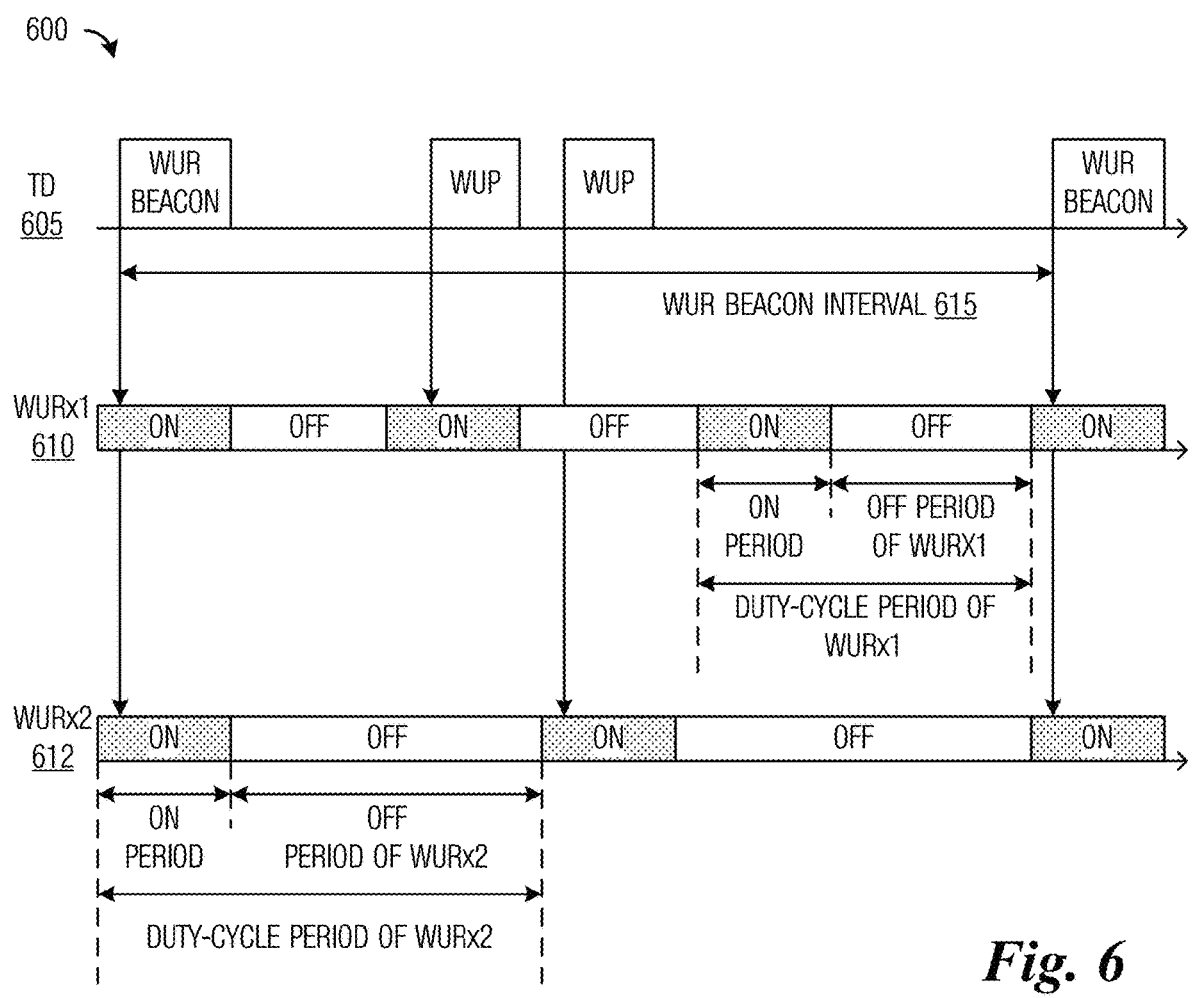
FIG. 6 illustrates a diagram of example wake-up operations in a synchronous duty-cycled mode.

FIG. 6 illustrates a diagram 600 of example wake-up operations in the synchronous duty-cycled mode. As shown in FIG. 6, a transmitting device (such as the AP) 605 periodically transmits (broadcasts or multicasts) a beacon packet complying with the WUR signaling format (such as that the signaling bandwidth is 5 MHz or less and that the modulation scheme used is OOK) and containing information of a clock of the transmitting device. Such a beacon packet is hereby referred to herein as a WUR Beacon in order to differentiate it from the conventional 802.11 Beacon frame, which complies with the conventional 802.11 signaling format (such as that the signaling bandwidth is 20 MHz or more and that the modulation scheme used is OFDM). The clock information contained in the WUR Beacons is used by the WURx of the receiving device (such as WURx1 610 and WURx2 612) to maintain synchronization between a clock of the receiving device and the clock of the transmitting device.

An example of the clock information is a timestamp (also known as a timer synchronization function or TSF) or partial timestamp (such as partial TSF) value, which is the value of a timer incremented at a uniform rate in accordance with a local oscillator. The TSF is defined in IEEE Standard 802.11-2016 as a 64-bit timer, which increments once every 1 microsecond. A partial TSF (PTSF) is a specific subset of the 64 bits of the TSF, typically by eliminating a certain number of most significant bits (MSBs) (due to the excessive range of time that can be expressed by these MSBs) and a certain number of least significant bits (LSBs) (due to the excessive granularity of time that can be expressed by these LSBs). Thus, the receiving device may correct any drift of its local clock (relative to the clock of the transmitting device) with the clock information (of the transmitting device) received in a WUR Beacon. In addition, the transmitting device also knows the durations of the "On", "Off", and duty-cycle periods of the WURx of the receiving device. For example, the transmitting device is an AP serving one or more STAs (i.e., the receiving devices) and the AP obtains information related to the durations of the "On", "Off", and duty-cycle periods of the WURx of each of the one or more STAs served by the AP when the AP performs an association procedure or a WUR configuration procedure with the RCM of the each STA. Through information conveyed from the transmitting device to the receiving device, the transmitting device and the receiving device also agree on a clock value where a duty-cycle of the receiving device starts, while an "On" period typically starts at the beginning of a duty-cycle period. Hence, the transmitting device is able to determine when an "On" period of the WURx of the receiving device starts and ends in accordance with the clock of the transmitting device, because the receiving device is supposed to determine when its "On" periods start and end in accordance with its local clock, which is synchronized with the clock of the transmitting device. Therefore, the transmitting device is able to send a wake-up packet to the WURx during the "On" period of the WURx.

The transmitting device also periodically transmits a WUR Beacon during an "On" period of the WURx of the receiving device. Due to the possibility of different receiving devices having different requirements for power consumption and wake-up latency, the transmitting device may negotiate or configure a same duration of "On" periods for the WURxes of all receiving devices but with different durations of duty-cycle periods (thus different duty ratios) for the WURxes of different receiving devices. FIG. 6 illustrates such a scenario. Alternatively, the transmitting device may negotiate or configure a same duration of duty-cycle periods for the WURxes of all receiving devices but with different durations of "On" periods (thus different duty ratios) for the WURxes of different receiving devices. Yet alternatively, the transmitting device may negotiate or configure different durations for both "On" periods and duty-cycle periods for the WURxes of different receiving devices. However, it is preferred that at least once in a while, the "On" periods of different receiving devices are aligned so that the transmitting device may broadcast or multicast a WUR beacon for all receiving devices to synchronize their local clocks. For example, as shown in FIG. 6, by making the interval between two successive WUR Beacons (referred to as the WUR Beacon interval 615) both an integer multiple of a duty-cycle period of WURx1 610 and an integer multiple of a duty-cycle period of WURx2 612, the "On" periods of WURx1 610 and WURx2 612 are aligned at least once every period referred to as the WUR Beacon interval.

However, there are certain drawbacks of the synchronous duty-cycled mode. For example, when both a wearable device (WD) and a smartphone serving the WD (i.e., the smartphone is operating as the serving AP for the WD) need to sleep for power saving purposes, requiring the smartphone to periodically transmit WUR Beacons reduces the sleep time of the smartphone, thus increasing the power consumption of the smartphone. In addition, transmitting WUR Beacons incurs additional system overhead as the channel time occupied by transmitting WUR Beacons cannot be used for transmitting data. For example, with a ±100 ppm clock drift and a 5 msec "On" period, the transmitting device needs to transmit WUR Beacons at least once every 25 seconds in order for the WURx of the receiving device to correct its clock before the clock drifts too far for the WURx to receive any WUR Beacons from the transmitting device in the first place. Furthermore, reinforcing such minimal requirement without significant margin for error may still cause the WURx to become unable to receive any subsequent WUR Beacons when the WURx occasionally misses the detection of one WUR Beacon and its clock drifts too far to be corrected by the next WUR Beacon (all arising from not being able to receive the next WUR Beacon in the first place). Furthermore, a malicious attacker seeking to deny services to a receiving device may send faked WUR Beacons with purposefully erroneous clock information to cause the WURx of the receiving device to set its clock to a wrong time, resulting in the WURx of the receiving device being in an "On" period at the wrong time (e.g., during a time that the transmitting device considers as "Off" for the receiving device).

Figure 7:
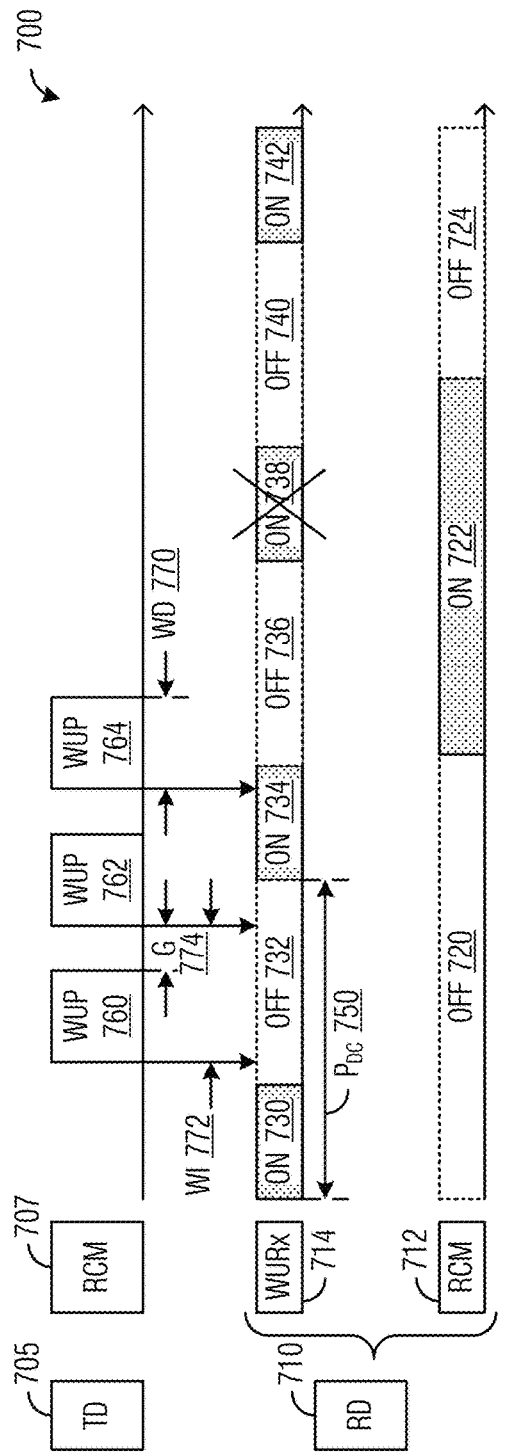
FIG. 7 illustrates a diagram of example wake-up operations in an asynchronous duty-cycled mode.

FIG. 7 illustrates a diagram 700 of example wake-up operations in an asynchronous duty-cycled mode. As shown in FIG. 7, similar to the synchronous duty-cycled mode, a WURx (such as WURx 714) of a receiving device (such as a STA) 710 operating in the asynchronous duty-cycled mode alternates between the "On" and "Off" periods in accordance with its local clock, while an RCM 712 of receiving device 710 is initially sleeping (shown as dot-lined OFF block 720). A consecutive "On" period followed by an "Off" period is defined as a duty-cycle. For a single WURx, the duty-cycle remains fixed until adjusted, and is defined as a combined duration of the "On" and the "Off" period, such as $P_{DC}$ 750. During the "On" periods (shown as shaded ON blocks 730, 734, and 742), WURx 714 becomes active and listens for the wake-up packet. During the "Off" periods (shown as dot-lined OFF blocks 732, 736, and 740), WURx 714 becomes inactive and unable to receive the wake-up packet. However, the local clock of WURx 714 may not be synchronized with a remote clock of an RCM 707 of a transmitting device (such as an AP) 705 attempting to wake up RCM 712, as RCM 707 is not required to transmit any WUR Beacons. RCM 707 knows the durations of the "On", "Off", and duty-cycle periods of WURx 714, as described before. However, RCM 707 may not know when an "On" period of WURx 714 starts or ends, because the clock of WUR 714 (relative to the clock of RCM 707) may have drifted and cannot be corrected without the WUR Beacons from RCM 707. In this situation, when RCM 707 needs to wake up RCM 712, RCM 707 may transmit a sequence of wake-up packets (such as WUPs 760, 762, and 764) to WURx 714 to ensure that at least one wake-up packet is transmitted during an "On" period of WURx 714 and therefore can be received by WURx 714.

In order to ensure that at least one wake-up packet out of the sequence of wake-up packets is transmitted within an "On" period of WURx 714 without knowing when an "On" period of WURx 714 starts, RCM 707 needs to transmit the sequence of wake-up packets meeting both of the following conditions:

$$WI \leq P_{ON} - WD; \quad \text{Condition \#1:}$$

$$(N-1) \times WI \geq P_{OFF} + WD, \quad \text{Condition \#2:}$$

where WI (the abbreviation for wake-up packet (WUP) interval) is a duration (such as WUP Interval 772) spanning between the beginnings of two successive wake-up packets, WD (the abbreviation for wake-up packet (WUP) duration) is a duration (such as WUP Duration 770) of a wake-up packet, $P_{ON}$ is the duration of an "On" period (such as ON period 730), $P_{OFF}$ is the duration of an "Off" period (such as OFF period 732), N is the total number of wake-up packets in the sequence. Meeting condition #1 above ensures that the duration of a gap (such as G 774) between two successive wake-up packets (such as WUPs 760 and 762), which is equal to (WI−WD), is less than or equal to ($P_{ON}$−2×WD), so that, even if the gap occurs in the middle of an "On" period, at least one of the wake-up packet immediately before the gap and the wake-up packet immediately after the gap entirely occurs within the "On" period, or in short, that the gap is sufficiently small. Meeting condition #2 above ensures that the period spanned by the entire sequence of wake-up packets, which equals to ((N−1)×WI+WD), is more than or equal to the sum of the duration of the "Off" period and the duration of 2 wake-up packets (for one immediately before the "Off" period and another immediately after the "Off" period); or in short, that the entire sequence of wake-up packets spans over a time period that is sufficiently long.

FIG. 7 also shows that WUP 764 is transmitted during "On" period 734 and is therefore received by WURx 714. It is noted that once a WURx begins receiving a WUP, the WURx may continue receiving the entirety of the WUP, even if the WURx was scheduled to leave the "On" period before the WUP is received in its entirety. As a result, RCM 712 is woken up during shaded ON period 722, during which time RCM 712 may exchange data with RCM 707. Then, RCM 712 may resume sleeping (shown as dot-lined OFF block 724). While RCM 712 is awake, WURx 714 may not need to resume active during a scheduled "On" period (such as shaded ON block 738, which is shown as being crossed out because WURx 714 may stay sleeping during that period).

However, there are certain drawbacks of the asynchronous duty-cycled mode as shown in FIG. 7. For example, if the gap between two successive wake-up packets (such as G 774 between WUPs 760 and 762) is made too small, for example, due to a short "On" period to fit in, or if the channel time for transmitting the entire sequence of wake-up packet is protected, for example, by reserving the channel time as a single transmission opportunity (TXOP), other devices running delay-sensitive applications (such as real-time voice or video applications) may not be able to access the shared channel when they need to, and as a result, these applications may experience poor quality of services (QoS). On the other hand, if the gap is made too large, other devices may be able to obtain access to the channel during the gap, and these other devices may continue to occupy the channel so that the next "On" period of WURx 714 may pass by with RCM 707 being unable to transmit a wake-up packet to WURx 714. Therefore, system and method are needed to overcome these drawbacks so that an enhanced asynchronous duty-cycled mode may be a practically useful mode of operation for waking up a sleeping device.

According to an example embodiment, an enhanced asynchronous duty-cycled mode is provided, wherein a transmitting device schedules the transmission of a sequence of wake-up packets, where the wake-up packets are spaced sufficiently close to one another to cover sufficient number of testing spots within a duty cycle (or equivalently so) and the sequence is sufficiently long to ensure that at least one wake-up packet in the sequence of wake-up packets is transmitted during an "On" period of a WURx. The interval between the beginnings of two consecutive wake-up packets is equal to a sum of a WI value meeting Condition #1 as presented previously and an integer multiple of the duty-cycle period of the WURx, wherein the integer may be zero or a positive integer, for example. Additionally, according to the example embodiment, the transmitting device, upon determining that the channel is occupied during a scheduled time for transmitting the next wake-up packet in the sequence of wake-up packets, reschedules the transmission of the next wake-up packet one duty-cycle period later. The rescheduling of the transmission of the next wake-up packet one duty-cycle period later ensures that meeting the requirements of the spacing between the wake-up packets (for covering sufficient number of testing spots within a duty cycle) and the length of the sequence of wake-up packets are maintained (in other words, conditions #1 and #2, presented previously, continue to be met, not literally, but in a manner with the same effect when viewed in the perspective of a sliding window that is one or more duty-cycle periods in size), thereby, ensuring that at least one wake-up packet is transmitted during an "On" period of the WURx.

Figure 8:
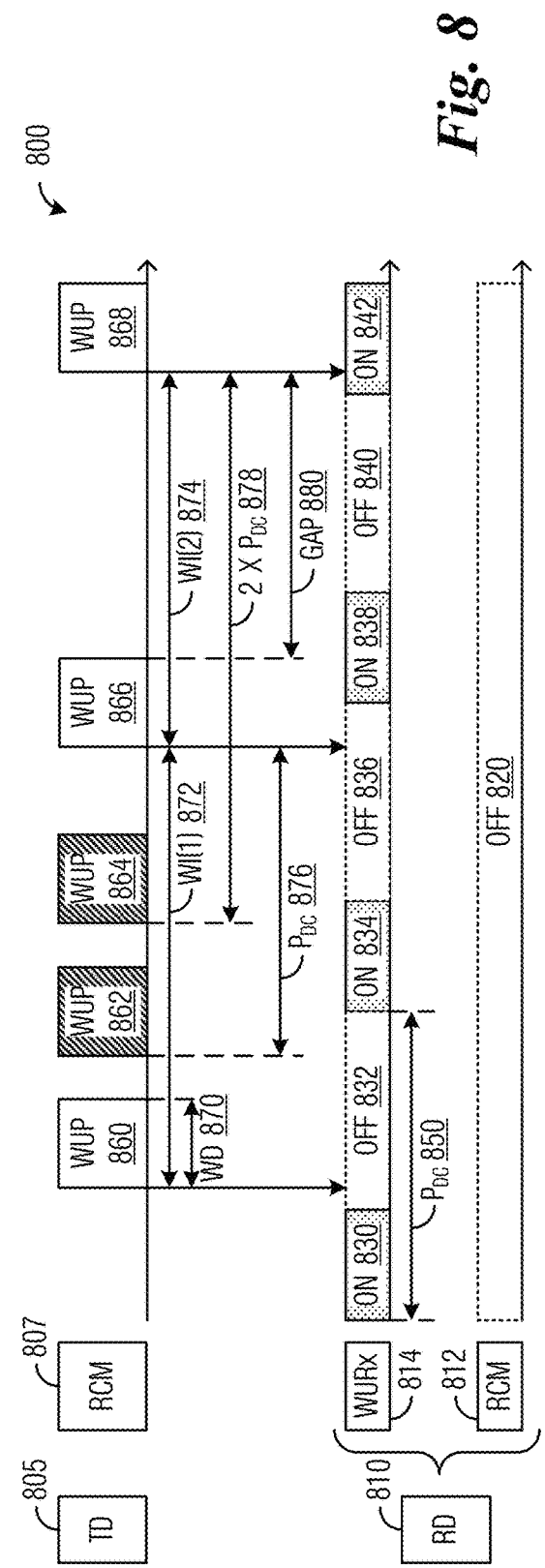
FIG. 8 illustrates a diagram of example wake-up operations in an enhanced asynchronous duty-cycled mode according to example embodiments described herein.

FIG. 8 illustrates a diagram 800 of example wake-up operations in an enhanced asynchronous duty-cycled mode according to example embodiments described herein. As shown in FIG. 8, a WURx (such as WURx 814) of a receiving device (such as a STA) 810 operating in the enhanced asynchronous duty-cycled mode alternates between the "On" and "Off" periods in accordance with its local clock, while an RCM (such as RCM 812) of receiving device 810 is sleeping (shown as dot-lined OFF block 820). During the "On" periods (shown as shaded ON blocks 830, 834, 838, and 842), WURx 814 is active and detects for the wake-up packet. During the "Off" periods (shown as dot-lined OFF blocks 832, 836, and 840), WURx 814 is inactive and unable to receive the wake-up packet. $P_{DC}$ 850 represents the duration of the duty-cycle of WURx 814. The local clock of WURx 814 may not be synchronized with a remote clock of an RCM (such as RCM 807) of a transmitting device (such as an AP) 805 attempting to wake up RCM 812, because RCM 807 is not required to transmit any WUR Beacons. RCM 807 knows the durations of the "On", "Off", and duty-cycle periods of WURx 814, as described before. However, RCM 807 may not know when an "On" period of WURx 814 starts or ends, as the clock of WURx 814 may have drifted (relative to the clock of RCM 807), which can't be corrected without RCM 807 transmitting and WURx 814 receiving the WUR Beacons. An "On" period may also be referred to as an awake period, an active period, or the like. And an "Off" period may also be referred to as a sleep period, a doze period, an inactive period, a low-power period, or the like.

In this situation, when RCM 807 needs to wake up RCM 812, RCM 807 transmits a sequence of wake-up packets (such as wake-up packet 325 as described before) to WURx 814 in a manner such that the transmissions of these wake-up packets are spread out (as opposed to the tightly packed sequence of wake-up packets as shown as in FIG. 7) and yet ensures that at least one wake-up packet is transmitted during an "On" period of WURx 814 and therefore can be received by WURx 814. RCM 807 may ensure that at least one wake-up packet is transmitted during an "On" period of WURx 814 by extending the transmission times of the wake-up packets (and thereby, extending the WIs, which meet the conditions #1 and #2 as presented previously), by one or multiple integers of duty-cycle periods. For example, RCM 807 transmits the first wake-up packet (shown as clear block WUP 860) of the sequence of wake-up packets. Then, instead of transmitting the second wake-up packet at where it is shown as shaded block WUP 862 (which would have satisfied Condition #1), RCM 807 transmits the second wake-up packet at where it is shown as clear block WUP 866. Comparing to WUP 862, WUP 866 is deferred by the duration of one duty-cycle period ($P_{DC}$ 876, which is equal to $P_{DC}$ 850).

Similarly, the third wake-up packet (shown as clear block WUP 868) is deferred by the duration of two duty-cycle periods relative to shaded block WUP 864 (which would have satisfied Condition #1). As a result, both the wake-up packet interval between WUPs 860 and 866 (shown as interval WI(1) 872) and that between WUPs 866 and 868 (shown as interval WI(2) 874) have been extended by one duty-cycle period, relative to the wake-up packet interval between WUPs 760 and 762 (shown as interval WI 772 in FIG. 7). It is noted that because the intervals between wake-up packets are extended by integer multiples of the duty-cycle period, the relative positions of the wake-up packets with respect to the duty-cycle period is maintained. In other words, according to the enhanced asynchronous duty-cycled mode, the transmission times of the wake-up packets in the sequence of wake-up packets modulo the duty-cycle period is the same as the transmission times of the wake-up packets in the sequence of wake-up packets shown in FIG. 7. Due to limited space for illustration, FIG. 8 shows a sequence of only three wake-up packets, which is sufficient for covering a duty-cycle period of WURx 814. However, the sequence of wake-up packets may include any number of wake-up packets, as long as the conditions presented herein are met. An expression for determining a minimum number of wake-up packets that will meet the conditions discussed herein is presented below.

In other situations, a sequence of more wake-up packets may be needed and the extending of subsequent wake-up packet intervals may continue so on and so forth, as described above. As a result of extending the wake-up packet intervals, the gap between two successive wake-up packets (such as Gap 880 between WUPs 866 and 868) is significantly enlarged, giving other devices ample time to access the shared channel for transmissions. FIG. 8 also shows that WUP 868 is transmitted during "On" period 842 and is therefore received by WURx 814. However, due to limited space for illustration, FIG. 8 doesn't show that RCM 812 is woken up, exchange data with RCM 807, and resumes sleeping after that, and so on and so forth.

Although the wake-up packet intervals in FIG. 8 (such as WI(1) 872 and WI(2) 874) have been extended, they continue to meet both of the following conditions:

modulo($WI(n),P_{DC}$)≤$P_{ON}$−WD, for $i=1, \ldots, (N-1)$; and    Condition #3:

$\Sigma_{n=1}^{N-1}$=(modulo($WI(n),P_{DC}$)−$P_{OFF}$+WD,    Condition #4:

where modulo(x, y) is the modulo function, which produces the remainder after dividing x by y, WI(n) is the nth wake-up packet interval within the sequence of wake-up packets, and $P_{DC}$ is the duration of the duty-cycle period and $P_{DC}$=$P_{ON}$+$P_{OFF}$, while N, WD, $P_{ON}$, and $P_{OFF}$ are as defined before. Meeting Condition #3 would be equivalent to meeting Condition #1. And meeting Condition #4 would be equivalent to meeting Condition #2. In practice, because the local clock of the WURx may continue to drift during the extended interval, a margin may be considered so that the WI(i) determined with a margin should be (slightly) less than the WI(i) determined from Condition #3. Additionally, the N determined with a margin should be (slightly) more than the N determined from Condition #4.

Generally speaking, transmitting a wake-up packet within the sequence of wake-up packets may be made opportunistically by the transmitting device assigning a lower access priority to each of the sequence of wake-up packets used for waking up a receiving device operating in the enhanced asynchronous duty-cycled mode. Then each wake-up packet of the sequence of wake-up packets is transmitted at a scheduled transmission time of that wake-up packet if the channel is idle. But if the channel isn't idle at the scheduled transmission time, the scheduled transmission time of that wake-up packet is simply deferred by one duty-cycle period of that WURx and that wake-up packet is placed in the transmission queue among the remaining wake-up packets to be transmitted, arranged in transmission time order, for example.

Figure 9:
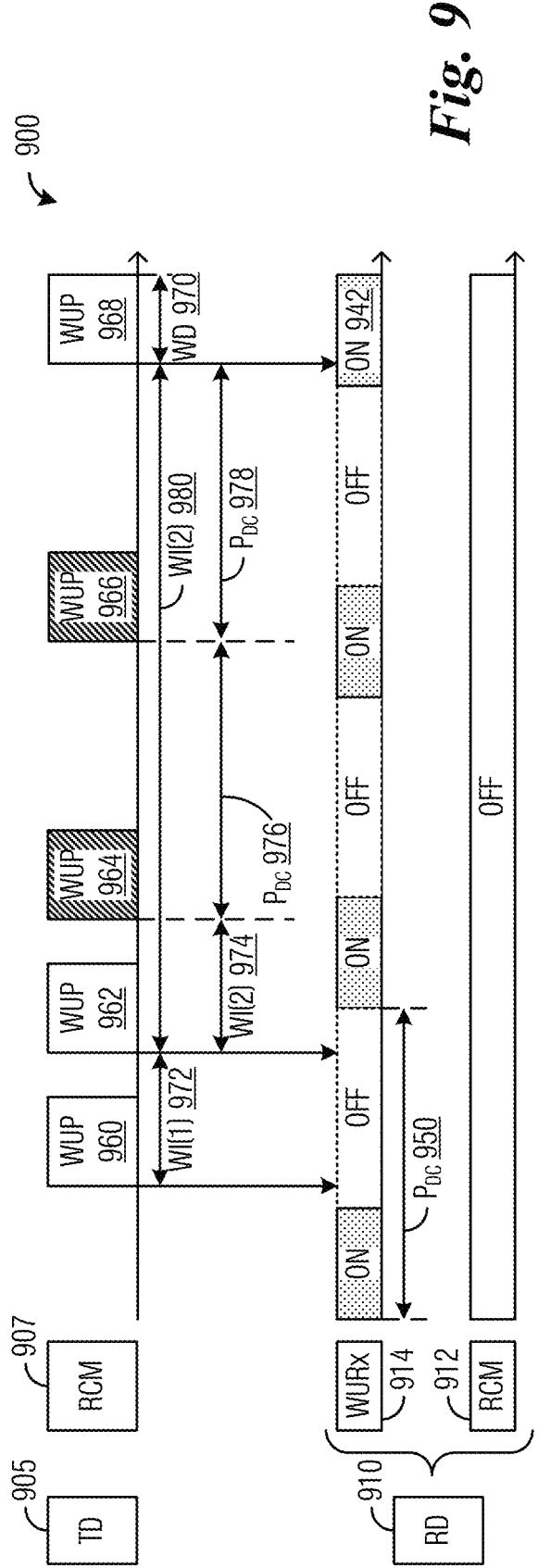
FIG. 9 illustrates a diagram of example wake-up operations in another enhanced asynchronous duty-cycled mode according to example embodiments described herein.

FIG. 9 illustrates a diagram 900 of example wake-up operations in the enhanced asynchronous duty-cycled mode with the further generalization according to example embodiments described herein. As shown in FIG. 9, a transmitting device (such as an AP) 905 may configure a mode of wake-up operation with a receiving device (such as a STA) 910 while an RCM (such as RCM 912) of receiving device 910 is active. The configuration may include configuration of a duty-cycled mode and values of any two of the following: duration of each duty cycle, duration of each "On" period, and duration of each "Off" period. It is noted that obtaining any two of these three values would allow for the determining of the remaining value. A WURx 914 of receiving device 910 has a duty-cycle period of $P_{DC}$ 950.

Later, when RCM 912 becomes inactive and RCM 907 (or equivalently, transmitting device 905) needs to wake up RCM 912, RCM 907 may initially schedule to transmit a sequence of wake-up packets (such as wake-up packet 325 as described before), which are shown as clear block WUPs 960 and 962, and shaded WUP 964 in FIG. 9. Both the wake-up packet interval between WUPs 960 and 962 (shown as WI(1) 972) and that between WUPs 962 and 964 (shown as WI(2) 974) are not extended and each satisfies Condition #1 (and Condition #3 as well because modulo (WI(n), $P_{DC}$)=WI(n), if WI(n) is not extended). In fact, WI(1) 972 and WI(2) 974 (as well as the other wake-up intervals of the same sequence of wake-up packets, if there are more wake-up intervals) do not have to have the same duration as long as each of them satisfies Condition #1. RCM 907) determines the total number (N) of wake-up packets in the sequence of wake-up packets to meet the following condition (which is a generalized form of Condition #2):

$$\Sigma_{n=1}^{N-1} WI(n) \geq P_{OFF} + WD.$$ Condition #5:

For the sake of simplicity, let each WI(n) have the same duration value WI. Then, WI is determined as:

$$WI = P_{ON} - WD$$ (Equation 1).

Then, N is expressible as:

$$N = \frac{P_{OFF} + WD}{WI} + 1 = \frac{P_{OFF} + WD}{P_{ON} - WD} + 1.$$ (Equation 2)

In the example illustrated in FIG. 9, N is equal to 3. Then, assuming that RCM 907 transmits the first wake-up packet at a time T(1), the scheduled transmission time of each subsequent wake-up packet, T(n), is expressible as:

$$T(n) = T(1) + (n-1) \times WI = T(1) + (n-1) \times (P_{ON} - WD), \text{ for } n=2 \text{ to } N$$ (Equation 3).

Then, as RCM 907 attempts to transmit each subsequent wake-up packet at the scheduled transmission time of that wake-up packet and if the channel is idle, RCM 907 transmits that wake-up packet; otherwise, if the channel is not idle, RCM 907 defers the scheduled transmission time of that wake-up packet by one duty-cycle period of WURx 914 and places that wake-up packet into the transmission queue in accordance with the deferred transmission time among the remaining wake-up packets to be transmitted. The transmitting of the sequence of wake-up packets may stop when RCM 907 receives a frame from RCM 912 conveying information that RCM 912 has been woken. If the transmitting of the sequence of wake-up packets in its entirety is completed without RCM 907 receiving a frame from RCM 912 conveying information that RCM 912 has been woken, RCM 907 may consider that the wake-up operations have failed and may re-try the wake-up operations by initiating the transmission of another sequence of wake-up packets, and so on and so forth until RCM 907 reaches a maximal number for re-tries, or give up.

FIG. 9 shows that transmissions of WUPs 960 and 962 occur at the scheduled transmission times, respectively, but the transmission of WUP 964 is first deferred by one duty-cycle period (shown as $P_{DC}$ 976) to become WUP 966, then the transmission of WUP 966 is further deferred by another duty-cycle period (shown as PDC 978) to become WUP 968, which is successfully transmitted. The wake-up packet interval (shown as WI(2) 980) between WUP 962 and the transmitted WUP 968 is equal to the sum of two duty-cycle periods ($P_{DC}$ 976 and $P_{DC}$ 978) and WI (shown as WI(2) 974), which was initially determined in accordance with equation (1) as described before. Because WI(2) 974 meets Condition #1, WI(2) 980 meets Condition #3. While deferring WUP 964 and its successor WUP 966, RCM 907 doesn't need to re-try the transmission of WUP 960, WUP 962, at one duty-cycle period later, even though the channel appears idle at those times, because within a sliding window of one duty-cycle period, those time positions may be considered as having been tried and failed to wake up RCM 912. In the example wake-up operations in FIG. 9, there are three wake-up packets in the sequence of wake-up packets. In a situation where there are more wake-up packets after WUP 964 that are within the same sequence of wake-up packets, the deferring of WUP 964 (first to WUP 966, and then to WUP 968) doesn't automatically cause deferring of those wake-up packets that are after WUP 964. In other words, the deferring of a wake-up packet in the sequence of wake-up packets is determined on an individual basis. Eventually, WUP 968 is transmitted, coinciding with the "On" period 942, therefore is received by WURx 914. However, due to limited space for illustration, FIG. 9 doesn't show that RCM 912 is woken up, exchange data with RCM 907, and resumes sleeping after that, and so on and so forth.

Figure 10:
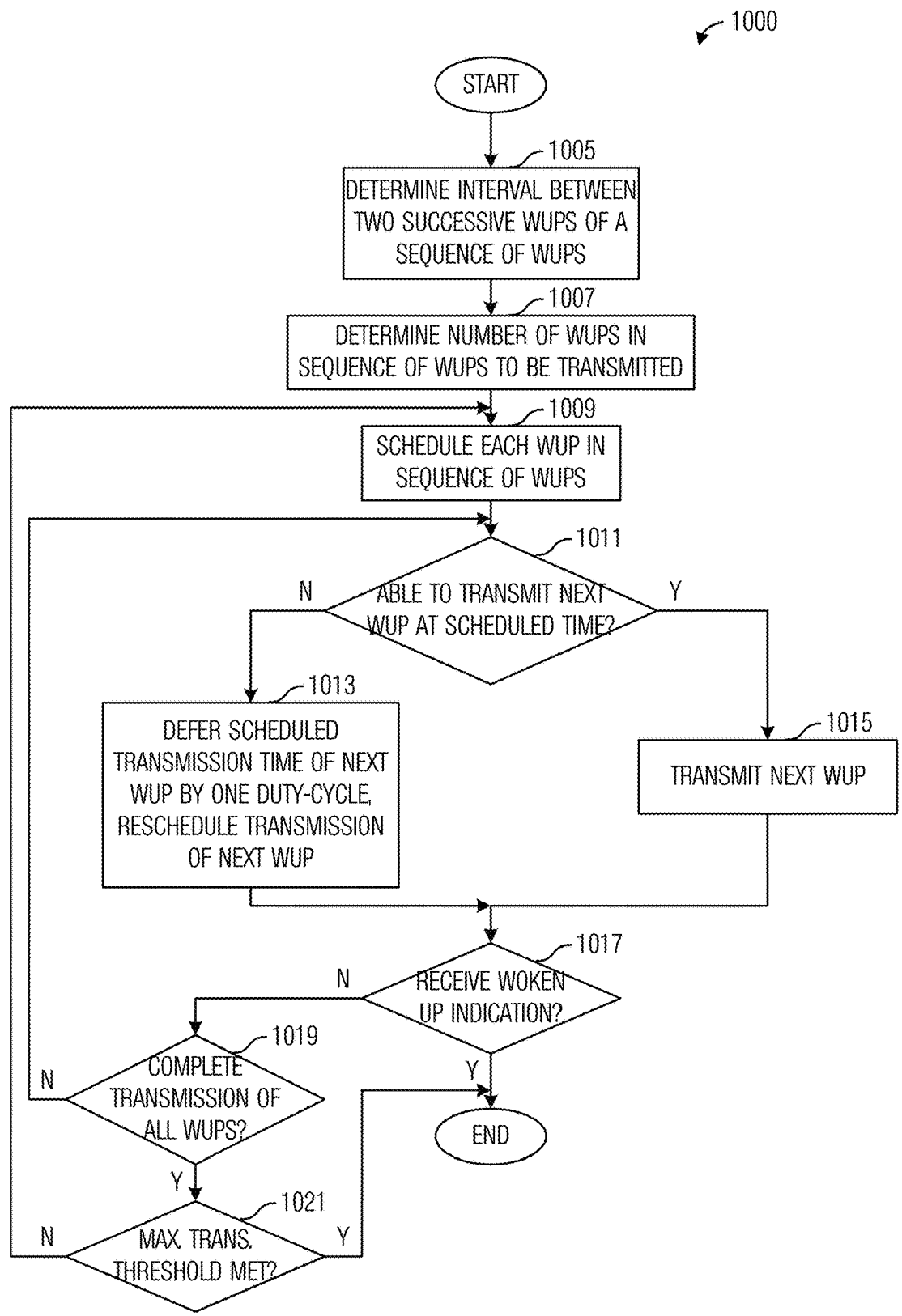
FIG. 10 illustrates a flow diagram of example operations occurring in a transmitting device supporting the enhanced asynchronous duty-cycled wake-up mode according to example embodiments described herein.

FIG. 10 illustrates a flow diagram of example operations 1000 occurring in a transmitting device supporting enhanced asynchronous duty-cycled wake-up mode. Operations 1000 may be indicative of operations occurring in a transmitting device as the transmitting device supports enhanced asynchronous duty-cycled wake-up mode.

Operations 1000 begin with the transmitting device determining wake-up intervals between two successive wake-up packets in a sequence of wake-up packets that the transmitting device will transmit to wake-up a receiving device (block 1005). The wake-up packet interval may be in accordance with a duration of the "Off" period of a WURx of a receiving device that the transmitting device is intending to wake-up and a wake-up packet duration. For example, the wake-up packet interval may be determined in accordance with Equation (1) previously present. Alternatively, the wake-up packet interval may differ for different pairs of successive wake-up packets all while meeting condition #3 as previously present. The transmitting device determines a number of wake-up packets in the sequence of wake-up packets (block 1007). The number of wake-up packets in the sequence of wake-up packets may be determined in accordance with the wake-up packet duration, the wake-up packet interval, and at least two of the following the duration of the "On" period, the duration of the "Off" period, and the duty-cycle duration, all while meeting condition #4 as previously presented. For example, the number of wake-up packets in the sequence of wake-up packets may be determined in accordance with Equation (2) previously present.

The transmitting device schedules the wake-up packets in the sequence of wake-up packets (block 1009). Scheduling the wake-up packets in the sequence of wake-up packets may involve determining a transmission time for each wake-up packet and placing the wake-up packets in a transmission queue arranged in accordance with the scheduled transmission time of each wake-up packet. As an example, the transmission times for the wake-up packets are determined in accordance with Equation (3) previously presented. When the current time is equal to a scheduled transmission time for a next wake-up packet in the sequence of wake-up packets, the transmitting device performs a check to determine if it is able to transmit the next wake-up packet (block 1011). In other words, the transmitting device performs a clear channel assessment (CCA) or some other equivalent operation to determine if the channel is available for the transmitting device to use to transmit the next wake-up packet.

If the transmitting device cannot transmit the next wake-up packet, the transmitting device defers the scheduled transmission time of the next wake-up packet and reschedules the transmission of the next wake-up packet (block 1013). As an example, the transmitting device defers the scheduled transmission time of the next wake-up packet by an integer multiple of the duty-cycle duration and the next wake-up packet is placed in the transmission queue in accordance with the deferred transmission time. If the transmitting device can transmit the next wake-up packet, the transmitting device transmits the next wake-up packet (block 1015). Transmitting the next wake-up packet may involve removing the next wake-up packet from the transmission queue, encoding the wake-up packet, and injecting the next wake-up packet onto the channel. The next wake-up packet is transmitted at (or substantially at) its scheduled transmission time.

Independent of whether or not the transmitting device is able to transmit the next wake-up packet in blocks 1011-1015, the transmitting device performs a check to determine if it has received information conveying that the receiving device has woken up (block 1017). If the transmitting device has received information conveying that the receiving device has woken up, operations 1000 terminate. If the transmitting device has not received information conveying that the receiving device has woken up, the transmitting device performs a check to determine if it has transmitted all of the wake-up packets in the sequence of wake-up packets (block 1019). If the transmitting device has not transmitted all of the wake-up packets in the sequence of wake-up packets, the transmitting device returns to block 1011 to transmit a subsequent wake-up packet in the transmission queue, which would be treated as a new "next wake-up packet" in the new iteration.

If the transmitting device has transmitted all of the wake-up packets in the sequence of wake-up packets (block 1019), the transmitting device may determine if a maximum transmission threshold for the sequence of wake-up packets has been met (block 1021). In other words, the transmitting device checks to determine if it has reached the maximum number of times for transmitting the sequence of wake-up packets. If not, the transmitting device may initiate the retransmission of the sequence of wake-up packets by returning back to block 1009, i.e., scheduling the new transmission times of each of the sequence of wake-up packets in block 1009. If the transmitting device has reached the maximum number of times for transmitting the sequence of wake-up packets, the transmitting device does not retransmit the sequence of wake-up packets and operations 1000 terminate.

With regard to the transmitting device not receiving information conveying that the receiving device having been woken up, the transmitting device may consider that the wake-up operations have failed and may initiate the transmission of another sequence of wake-up packets until reaching a retry limit. Therefore, the various embodiments presented herein may lead to a potentially long delay in waking up the receiving device. However, it is assumed that the enhanced asynchronous duty-cycled wake-up mode is used mainly for WUR-capable stations performing delay insensitive applications, such as sensor applications that may need to perform data readings a few times a day (e.g., a moisture sensor at a lawn or farm for controlling an irrigation system), an added delay on the order of seconds or minutes has negligible impact on the QoS on these types of applications.

With the various example embodiments of the enhanced asynchronous duty-cycled mode, the issues of the gaps (between consecutive wake-up packets in the sequence of wake-up packets) being too small or too big have been overcome, making the enhanced asynchronous duty-cycle mode practically useful, either as a standalone mode or as a fall-back mode when a communications system operating in the synchronous duty-cycled mode is under attack (e.g., when a malicious attack sends out faked WUR beacons with purposefully erroneous clock information). Therefore, method and system for signaling a selected mode of wake-up operation or switching from one mode to another is needed.

According to one example embodiment, a transmitting device includes, e.g., in a WUR Beacon Interval field in a WUR Mode element that the transmitting device transmits:
  A special value (e.g., a bit string of all i's, or a bit string of all o's), which may be standardized or pre-specified, as information to convey that the WUR Beacon interval is infinite (or some other impractically large value), therefore implying that the transmitting device will not be transmitting any WUR Beacons; or
  A non-special value (e.g., any value other than the special value) as information to convey that the transmitting device will transmit WUR Beacons periodically with a nominal interval as conveyed by the non-special value.

As an illustrative example, the transmitting device transmits such a WUR Mode element in the conventional 802.11 Beacon frame to announce whether it periodically transmits WUR Beacons. As another illustrative example, the transmitting device transmits such a WUR Mode element in a WUR request action frame or a WUR response action frame when the transmitting device and a receiving device use their respective RCMs to negotiate or configure pending wake-up operations between the RCM of the transmitting device and a WURx of the receiving device. Later, the transmitting device may change from transmitting WUR Beacons periodically to not transmitting any WUR Beacon, such as when detecting a security threat. Similarly, the transmitting device may change from not transmitting any WUR Beacon to transmitting WUR Beacons periodically, such as when detecting that the security threat is no longer present. When such a change occurs, the value of the WUR Beacon Interval field in the WUR Mode element is changed accordingly.

Figure 11A:
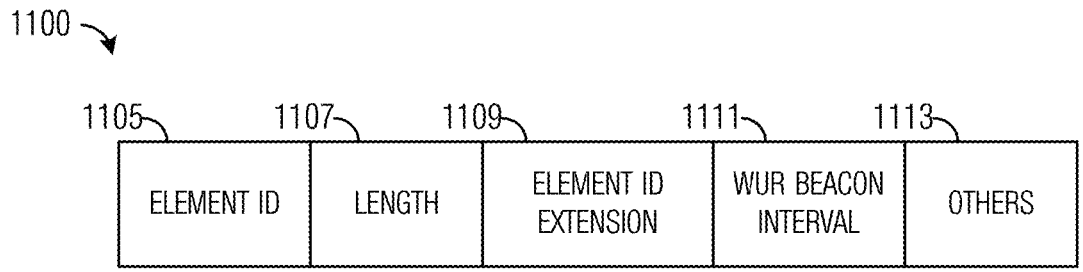
FIG. 11A illustrates an example element format of the WUR Mode element according to example embodiments described herein.

FIG. 11A illustrates an example element format of the WUR Mode element 1100. As shown in FIG. 11A, WUR Mode element 1100 includes an Element Identifier (ID) field 1105 containing value 255 as information to convey that the element ID is in an Element ID Extension field 1109, a Length field 1107 as information conveying the total lengths of the fields after Length field 1107, Element ID Extension field 1109 containing a value as information conveying that the element is the WUR Mode element, a WUR Beacon Interval field 1111 contains either the special value or a non special value as described above. WUR Mode element 1100 may further include Other fields 1113.

By sending information conveying whether or not it periodically transmits WUR Beacons, the transmitting device causes a receiving device to determine a mode of wake-up operation (e.g., out of the three modes previously presented, namely, the always-on mode, the synchronous duty-cycled mode, and the enhanced asynchronous duty-cycled mode) during a negotiation or configuration procedure with the transmitting device or during a time when the RCM of the receiving device is awake (e.g., for transmitting or receiving data). For example, when detecting that the transmitting device is not transmitting any WUR Beacons (e.g., as conveyed by information set to the special value in the WUR Beacon Interval field in a frame received from the transmitting device), the receiving device may negotiate or communicate with the transmitting device, using the RCM of the receiving device when the RCM is active, with regard to whether or not the WURx of the receiving device will operate in the always-on mode or the enhanced asynchronous duty-cycled mode when the RCM of the receiving device is sleeping. It is noted that there is a restriction in the choices available to the WURx (i.e., the unavailability of the synchronous duty-cycled mode) due to that the WURx is unable to operate in the synchronous duty-cycled mode without WUR Beacons. The determination between the always-on mode and the enhanced asynchronous duty-cycled mode may be made in accordance with a capability of the transmitting device, a capability of the receiving device, a power consumption requirement of the receiving device, a system efficiency requirement, presence or absence of a security threat, or a wake-up latency requirement. The determination may be made by the transmitting device and conveyed to the receiving device in the form of information, for example. Alternatively, the determination may be made by the receiving device and conveyed to the transmitting device in the form of information, for example. In yet another alternative, both the transmitting and receiving devices collaborate to make the determination. Later, the transmitting device may change to transmitting WUR Beacons periodically then later change back to not transmitting WUR Beacons, and so on and so forth. The determined mode of operations may be considered (e.g., by storing it as a configuration) by the transmitting device to be the default mode of operations for the WURx of the receiving device as long as the transmitting device doesn't transmit any WUR Beacon. Similarly, the determined mode of operations may be considered (e.g., by storing it as a configuration) by the receiving device to be the default mode of operations for the WURx of the receiving device as long as the receiving device is unable to receive any WUR Beacons from the transmitting device for a specified time period.

If the communications system allows the transmitting device to change from not transmitting any WUR Beacon to transmitting WUR Beacons periodically, the receiving device, while its RCM is active, may also negotiate or communicate with the transmitting device with regard to how to detect later, using the WURx of the receiving device, that the transmitting device changes from not transmitting any WUR Beacons to transmitting WUR Beacons periodically (e.g., by the WURx of the receiving device receiving a special WUR packet with a format similar to WUR packet 325 and with a specific WUID or a specific packet type value announcing such change), as well as with regard to which of the three modes that the WURx of the receiving device should enter when detecting that the transmitting device has changed from not transmitting any WUR Beacon to transmitting WUR Beacons periodically. Such determined mode of operations may be considered (e.g., by storing it as a configuration) by the transmitting device to be the default mode of operations for the WURx of the receiving device as long as the transmitting device transmits WUR Beacons periodically. Similarly, such determined mode of operations may be considered (e.g., by storing it as a configuration) by the receiving device to be the default mode of operations for the WURx of the receiving device as long as the receiving device is able to receive WUR Beacons from the transmitting device.

As another example, when detecting that the transmitting device transmits WUR Beacons periodically (e.g., as conveyed by information set to a non-special value in the WUR Beacon Interval field in a frame received from the transmitting device), the receiving device may negotiate or communicate with the transmitting device, using the RCM of the receiving device when the RCM is active, with regard to which of the three modes the WURx of the receiving device will operate in when the receiving device is sleeping. The determination of the selected mode out of the three modes may be made in accordance with a capability of the transmitting device, a capability of the receiving device, a power consumption requirement of the receiving device, a system efficiency requirement, presence or absence of a security threat, or a wake-up latency requirement. The determination may be made by the transmitting device and conveyed to the receiving device in the form of information, for example. Alternatively, the determination may be made by the receiving device and conveyed to the transmitting device in the form of information, for example. In yet another alternative, both the transmitting and receiving devices collaborate to make the determination. Such determined mode of operations may be considered (e.g., by storing it as a configuration) by the transmitting device to be the default mode of operations for the WURx of the receiving device as long as the transmitting device transmits WUR Beacons periodically. Furthermore, such determined mode of operations may be considered (e.g., by storing it as a configuration) by the receiving device to be the default mode of operations for the WURx of the receiving device as long as the receiving device is able to receive WUR Beacons from the transmitting device.

If the communications system allows the transmitting device to change from transmitting WUR Beacons periodically to not transmitting any WUR Beacon, the receiving device, while its RCM is active, may also negotiate or communicate with the transmitting device regarding whether or not the WURx of the receiving device should enter the always-on mode or the enhanced asynchronous duty-cycled mode later when the transmitting device changes from transmitting WUR Beacons periodically to not transmitting any WUR Beacon. The WURx of the receiving device may be able to detect the change by receiving an announcement in a special WUR packet (e.g., with a format similar to WUR packet 325 and with a specific WUID or a specific packet type value announcing such change) sent by the transmitting device, or by detecting no WUR Beacon transmitted by the transmitting device for a specified period.

Such determined mode of operations may be considered (e.g., by storing it as a configuration) by the transmitting device to be the default mode of operations for the WURx of the receiving device as long as the transmitting device doesn't transmit any WUR Beacon. Furthermore, such determined mode of operations may be considered (e.g., by storing it as a configuration) by the receiving device to be the default mode of operations for the WURx of the receiving device as long as the receiving device is unable to receive any WUR Beacons from the transmitting device for a specified time period.

When the transmitting device changes from transmitting WUR Beacons periodically to not transmitting any WUR Beacon (e.g., due to the detection of a security threat) or from not transmitting any WUR Beacon to transmitting WUR Beacons periodically (e.g., due to detecting the absence of the security threat), the transmitting device may announce the change by transmitting a special WUR packet with a format similar to WUR packet 325 and with a specific WUID or a specific packet type value corresponding to the specific change. The WURx of the receiving device may detect the change in the transmitting device by receiving the announcement (i.e., the special WUR packet) or by becoming unable to receive any WUR Beacon from the transmitting device for a specified period. The WURx of the receiving device may enter a mode previously agreed to (which may have been stored by the receiving device) with the transmitting device in accordance with the specific change detected and the transmitting device may assume that the WURx of the receiving device enters the previously agreed to mode (which may have been stored by the transmitting device) and will wake up the receiving device in accordance with that mode. Alternatively, the receiving device may wake up its RCM and negotiate or communicate with the transmitting device with regard to which one of the three modes that its WURx will operate in when the receiving device is sleeping.

Figure 11B:
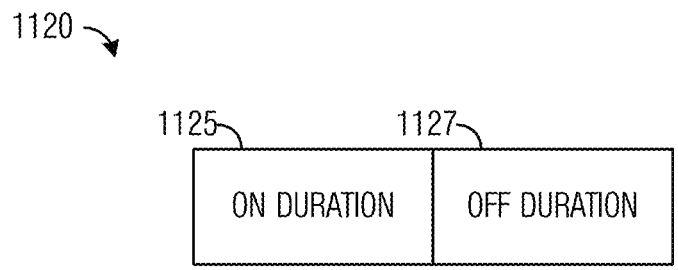
FIG. 11B illustrates an example format of a Duty-cycle field according to example embodiments described herein.

To convey if a mode is the always-on mode or one of the synchronous and the (enhanced) asynchronous duty-cycle mode, a Duty-cycle field may be used as information to convey the mode. FIG. 11B illustrates an example format of a Duty-cycle field 1120. As shown in FIG. 11B, Duty-cycle field 1120 includes an On Duration subfield 1125 as information conveying the duration of an "On" period of each duty-cycle and an Off Duration subfield 1127 as information conveying the duration of an "Off" period of each duty-cycle. In this situation, a value of zero contained in Off Duration subfield 1127 may be information conveying that the mode is the always-on mode, otherwise, the mode is one of the two duty-cycled modes (additional information may be needed to determine exactly which duty-cycled mode it is, for example, a value in the WUR Beacon Interval field as described before, which is information conveying whether the WUR Beacon is periodically transmitted, or for another example, information that is an explicit conveyance of synchronous or asynchronous). Alternatively, one of these two subfields (i.e., subfields 1125 or 1127) may be replaced by a Duty-cycle Duration subfield. As discussed before, knowing any two of these three parameters (i.e., the On duration, the Off duration, and the Duty-cycle duration) would allow the determination of the third one. In this situation, a value of zero contained in the Duty-cycle Duration subfield (or a same value in both the Duty-cycle Duration field and the On Duration field) may be information conveying that the mode is the always-on mode, otherwise, the mode is one of the two duty-cycled modes. Duty-cycle field 1120, as shown in FIG. 11B, may be included in a WUR Mode element. As an illustrative example, Duty-cycle field 1120 may be included in WUR Mode element 1100 as a part of Other fields 1113 (both of FIG. 11A).

Figure 11C:
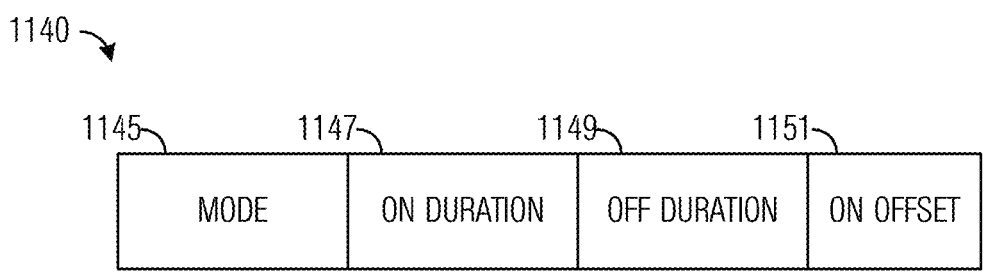
FIG. 11C illustrates an example format of a WUR Configuration field according to example embodiments described herein.

FIG. 11C illustrates an example format of a WUR Configuration field 1140, which contains more comprehensive information. As shown as in FIG. 11C, WUR Configuration field 1140 comprises a Mode subfield 1145 that includes information conveying that the mode is one of the three wake-up modes previously described. If the value in Mode subfield 1145 includes information conveying that the mode is the always-on mode, WUR Configuration field 1140 may include no other subfields. If the value in Mode subfield 1145 includes information conveying that the mode is the (enhanced) asynchronous duty-cycled mode, WUR Configuration field 1145 further includes an On Duration subfield 1147 and an Off Duration subfield 1149, where the two subfields include information conveying the durations of "On" and "Off" periods, respectively. If the value in Mode subfield 1145 includes information conveying that the mode is the synchronous duty-cycled mode, WUR Configuration field 1140 further includes On Duration subfield 1147 and Off Duration subfield 1149, where the two subfields include information conveying the durations of "On" and "Off" periods, respectively, and an On Offset subfield 1151 including information conveying a time offset value, wherein the WURx of the receiving device starts an "On" period when its local clock reaches the time offset value with respect to a reference point of time, such as a target beacon transmission time, which is defined in IEEE Standard 802.11-2016. As described before, as alternatives to including On Duration subfield 1147 and Off Duration subfield 1149, WUR Configuration field 1145 may include any two of the following three duration subfields to allow the determination of the third duration: On Duration subfield, Off Duration subfield, and Duty-cycle Duration subfield. WUR Configuration field 1140, as shown in FIG. 11C, may be included in a WUR Mode element. As an illustrative example, WUR Configuration field 1140 may be included in WUR Mode element 1100 as a part of Other fields 1113 (both of FIG. 11A).

Figures 12A, 12B:
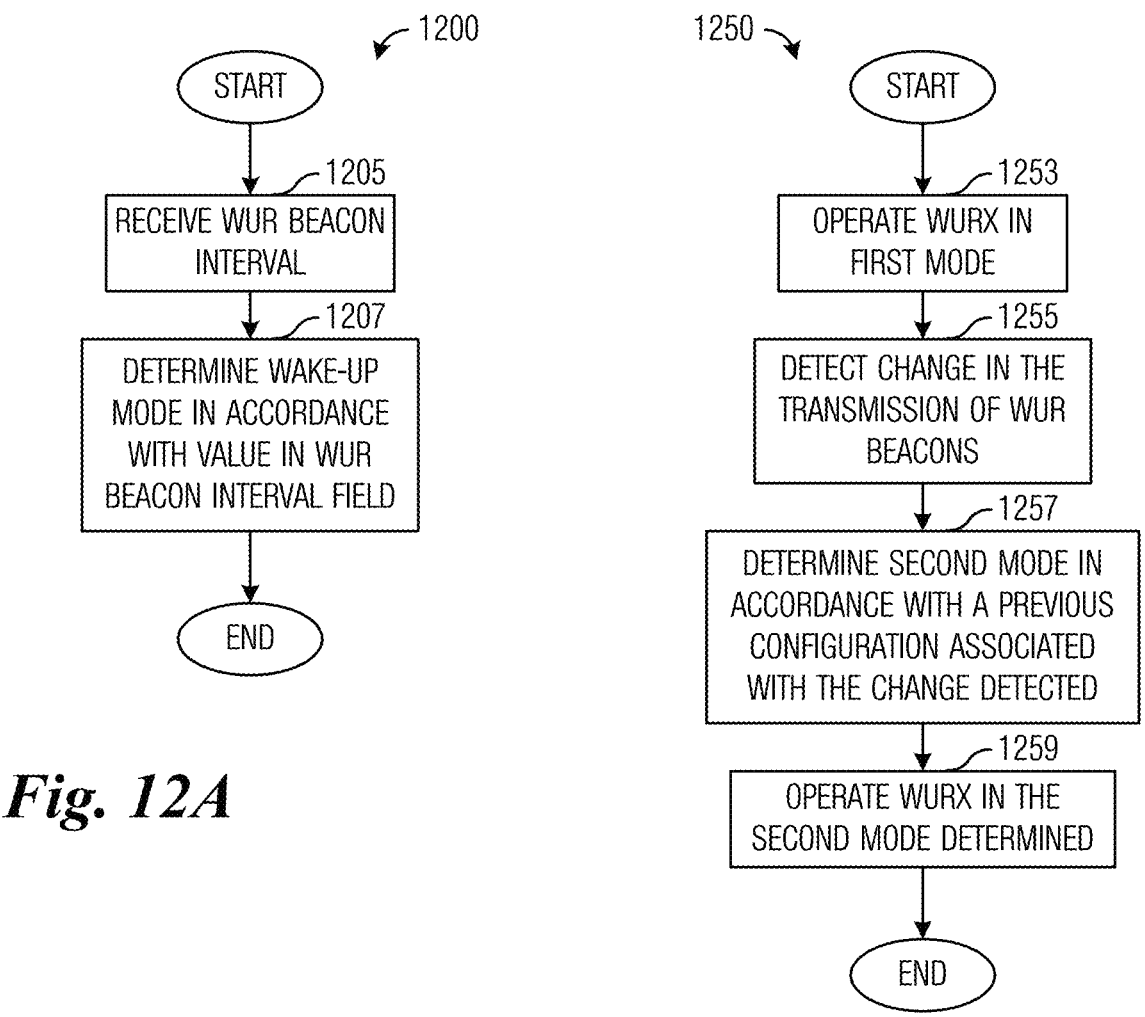
FIG. 12A illustrates a flow diagram of example operations occurring in a receiving device supporting the selection of a mode of wake-up operation out of various modes according to example embodiments described herein.
FIG. 12B illustrates a flow diagram of example operations occurring in a receiving device supporting the selection of a mode of wake-up operation from various modes response to a change in the transmission of WUR Beacons according to example embodiments described herein.

FIG. 12A illustrates a flow diagram of example operations 1200 occurring in a receiving device supporting the selection of a mode of wake-up operations out of various modes. Operations 1200 may be indicative of operations occurring in a receiving device as the receiving device supports the selection of a mode of wake-up operations out of various modes.

Operations 1200 begin with the receiving device receiving a frame with a WUR Beacon Interval field (block 1205). The WUR Beacon Interval field may be a part of a WUR Mode element, for example. The WUR Beacon Interval field may be a part of a Beacon frame, for another example. The WUR Beacon Interval field may be a part of a WUR response action frame, for yet another example. The receiving device determines a mode of wake-up operations in accordance with a value in the WUR Beacon Interval field (block 1207). As an illustrative example, if the value is the special value, the transmitting device will not be transmitting WUR Beacons periodically, therefore, the receiving device may operate in either the always-on mode or the enhanced asynchronous duty-cycled mode. As another illustrative example, if the value is not the special value, the transmitting device will transmit WUR Beacons periodically, therefore, the receiving device may operate in either the always-on mode or the synchronous duty-cycled mode. The determination of the selected mode may be made in accordance with a capability of the transmitting device, a capability of the receiving device, a power consumption requirement of the receiving device, a system efficiency requirement, presence or absence of a security threat, or a wake-up latency requirement. The determination may be made by receiving a WUR configuration from the transmitting device. Alternatively, the determination may be made by the receiving device and information is sent to the transmitting device to convey the determination. In yet another alternative, both the transmitting and receiving devices collaborate to make the determination.

FIG. 12B illustrates a flow diagram of example operations 1250 occurring in a receiving device supporting the selection of a mode of wake-up operations from various modes in response to a change in the transmission of WUR Beacons. Operations 1250 may be indicative of operations occurring in a receiving device as the receiving device supports the selection of a mode of wake-up operations from various modes in response to a change in the transmission of WUR Beacons.

Operations 1250 begin with the receiving device operating a WURx of the receiving device in a first mode of wake-up operations (block 1253). For example, the receiving device may operate in a mode of wake-up operations as determined by performing operations 1200. The receiving device detects a change in the transmission of WUR Beacons (block 1255). For example, the receiving device may detect the change by the WURx of the receiving device receiving a special wake-up packet (e.g., with a format similar to WUR packet 325 and with a specific WUID or a specific packet type value) announcing the change, wherein the change may be a change of a transmitting device from transmitting WUR Beacons periodically to not transmitting any WUR Beacon or from not transmitting any WUR Beacon to transmitting WUR Beacons periodically. For another example, the receiving device may detect the change by the WURx of the receiving device being unable to receive any WUR Beacon for a specified period, wherein the change is a change of the transmitting device from transmitting WUR Beacons periodically to not transmitting any WUR Beacon. The receiving device determines a second mode of wake-up operation in accordance with the change detected (block 1257). For example, the WURx of the receiving device determines the second mode in accordance with a previous negotiation or configuration associated with the change detected without waking up its RCM. For another example, the WURx of the receiving device wakes up the RCM of the receiving device and the receiving device uses its RCM to negotiate or communicate with the transmitting device pertaining to which mode will be the second mode that the WURx of the receiving device will operate in. Subsequently, the receiving device operates its WURx in the second mode of wake-up operations as determined (block 1259). Thus, the receiving device may switch the operation mode of its WURx in accordance with the change detected entirely without waking up its RCM.

Figure 12C:
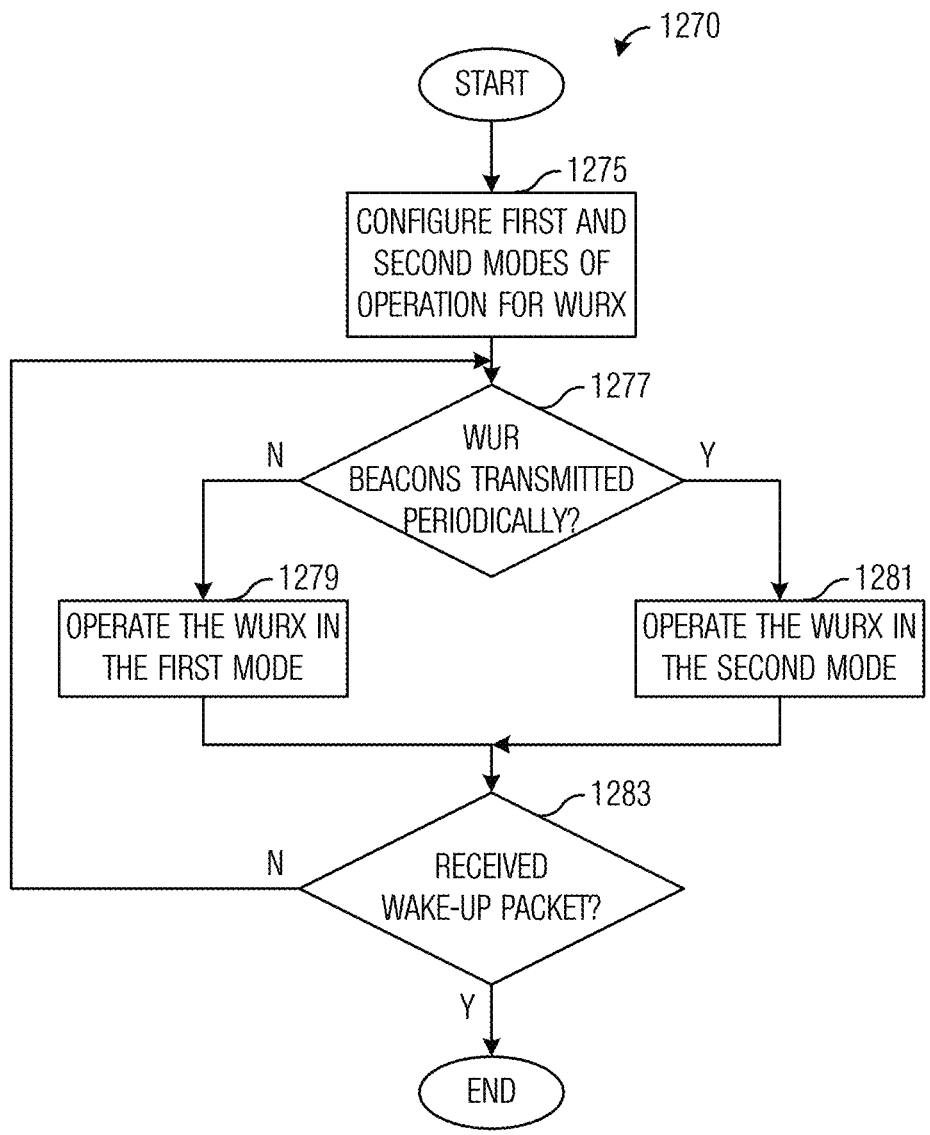
FIG. 12C illustrates a flow diagram of example operations occurring in a receiving device supporting the selection of a mode of wake-up operations from a plurality of modes in response to a transmission (or a lack) of WUR Beacons according to example embodiments described herein.

FIG. 12C illustrates a flow diagram of example operations 1270 occurring in a receiving device supporting the selection of a mode of wake-up operations from a plurality of modes in response to a transmission (or a lack) of WUR Beacons. Operations 1270 may be indicative of operations occurring in a receiving device as the receiving device supports the selection of a mode of wake-up operations from a plurality of modes in response to a transmission (or a lack) of WUR Beacons.

Operations 1270 begin with the receiving device configuring a first mode of operations and a second mode of operations with a transmitting device, using a RCM of the receiving device while the RCM is active, wherein the first mode of operations is used for operating the WUR receiver of the receiving device when the transmitting device doesn't transmit any WUR beacon and the second mode of operations is used for operating the WUR receiver of the receiving device when the transmitting device transmits WUR beacons periodically (block 1275). For example, the first mode of operations may be the always-on mode or the (enhanced) asynchronous duty-cycled mode, as described before. For another example, the second mode of operations may be the always-on mode, the (enhanced) asynchronous duty-cycled mode, or the synchronous duty-cycled mode, as described before. Configuring the first mode and the second mode with the transmitting device may further include exchanging messages that contain the information of the first mode and the second mode with the transmitting device. For example, the receiving device may send information to convey, in a message to the transmitting device, the first mode and the second mode. For another example, the receiving device may receive a message from the transmitting device information conveying the first mode and the second mode. The receiving device determines whether the WUR Beacons are transmitted periodically or not (block 1277). For example, when the RCM of the receiving device is active, the receiving device may determine whether the WUR Beacons are transmitted by the transmitting device periodically based on a value in the WUR Beacon Interval field (such as WUR Beacon Interval field 1111 in FIG. 11A) received using the RCM, as described before. For another example, when the RCM of the receiving device is inactive, the receiving device may determine whether the WUR Beacons are transmitted periodically based on whether the WURx of the receiving device receives a special WUR packet containing a first special WUID or a first special packet type, either of which conveys that the transmitting device doesn't transmit any WUR beacon or containing a second special WUID or a second special packet type, either of which conveys that the transmitting device transmits WUR beacons periodically. For yet another example, when the RCM of the receiving device is inactive, the receiving device may determine whether the WUR Beacons are transmitted periodically simply based on if its WURx receives no WUR Beacons at all within a specified time period or if its WURx is able to receive a specific number of WUR Beacons from the transmitting device within the specified time period. The receiving device operates its WURx in the first mode when determining that the WUR Beacons are not being transmitted periodically or at all (block 1279). And the receiving device operates its WURx in the second mode when determining that the WUR Beacons are transmitted periodically (block 1281). Then, the receiving device determines if it has received a wake-up packet (such as wake-up packet 325 as in FIG. 3) with a WUID matching its WUID (block 1283). If a wake-up packet with a WUID that matches its own is not received, the receiving device returns to block 1277. If a wake-up packet with a WUID that matches its own is received, operations 1270 terminate.

Figure 13A:
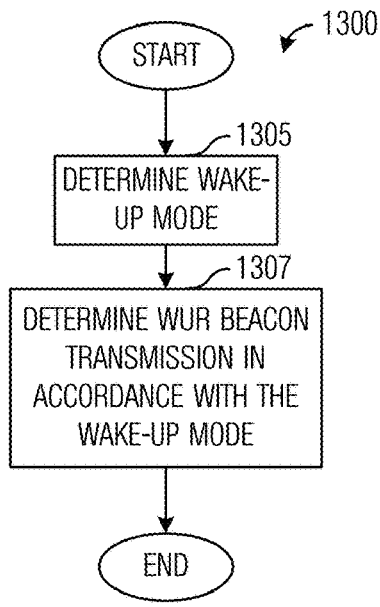
FIG. 13A illustrates a flow diagram of example operations occurring in a transmitting device supporting the selection of a mode of wake-up operation from various modes according to example embodiments described herein.

FIG. 13A illustrates a flow diagram of example operations 1300 occurring in a transmitting device supporting the selection of a mode of wake-up operation from various modes. Operations 1300 may be indicative of operations occurring in a transmitting device as the transmitting device supports the selection of a mode of wake-up operation from various modes.

Operations 1300 begin with the transmitting device determining a wake-up mode for each WURx of one or more receiving devices served by the transmitting device (block

1305). As an illustrative example, the transmitting device determines either an always-on or a duty-cycled mode (either synchronous or asynchronous) for the each WURx of the one or more receiving devices. In other words, the transmitting device may configure the WURxs of different receiving devices to operate in different modes. The determination of the wake-up mode may be made in accordance with a capability of the transmitting device, a capability of the receiving device, a power consumption requirement of the receiving device, a system efficiency requirement, presence or absence of a security threat, or a wake-up latency requirement. The transmitting device determines a WUR Beacon transmission mode in accordance with the wake-up mode or modes determined (block 1307). As an illustrative example, if the transmitting device determines that all of the one or more receiving devices are to use either the always-on mode or the (enhanced) asynchronous duty-cycled mode, the transmitting device determines that it does not need to transmit WUR Beacons. Thus, the transmitting device sets a value in the WUR Beacon Interval field (such as WUR Beacon Interval field 1111), in one or more frames (such as the 802.11 Beacon frames) that it transmits, to the special value conveying that it does not transmit WUR Beacons. As another illustrative example, if the transmitting device determines that at least one of the one or more receiving devices is to use the synchronous duty-cycled mode, the transmitting device determines that it does need to transmit WUR Beacons periodically, as well as a period for the WUR Beacons. Thus, the transmitting device sets a value in the WUR Beacon Interval field (such as WUR Beacon Interval field 1111), in one or more frames (such as the 802.11 Beacon frames) that it transmits, to a non-special value conveying the period for the WUR Beacons and implying that it transmits WUR Beacons periodically.

Figure 13B:
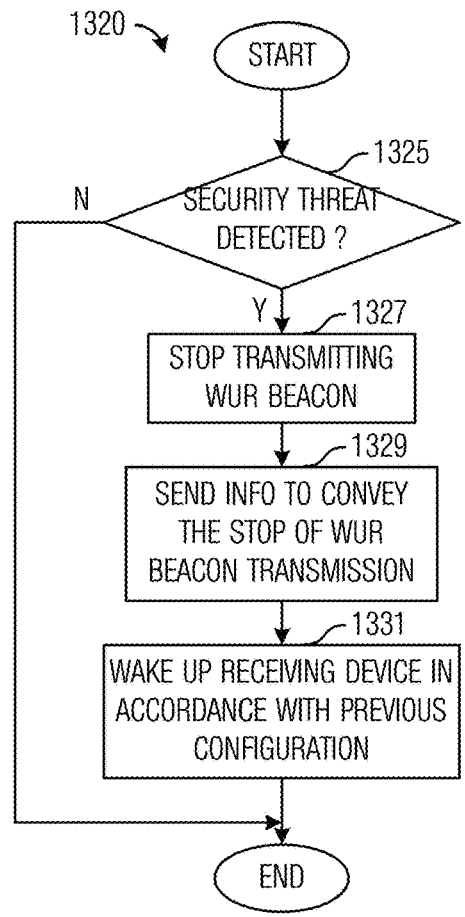
FIG. 13B illustrates a flow diagram of example operations occurring in a transmitting device supporting the selection of a mode of wake-up operation from various modes in response to the detection of a security threat according to example embodiments described herein.

FIG. 13B illustrates a flow diagram of example operations 1320 occurring in a transmitting device supporting the selection of a mode of wake-up operation from various modes in response to the detection of a security threat. Operations 1320 may be indicative of operations occurring in a transmitting device as the transmitting device supports the selection of a mode of wake-up operation from various modes in response to detecting a security threat.

Operations 1320 begin with the transmitting device performing a check to determine if a security threat has been detected (block 1325). For example, a security threat may be detected when a WUR Beacon carrying an identifier of the transmitting device and erroneous clock information is detected by the transmitting device or by a receiving device, which reports such detection to the transmitting device. For another example, a security threat may be considered as detected when the transmitting device is unable to wake up one or more receiving devices operating in the synchronous duty-cycled mode. If a security threat has not been detected, operations 1320 terminate. If a security threat has been detected, the transmitting device stops transmitting WUR Beacons (block 1327). The transmitting device sends information conveying the stopping of WUR Beacon transmission (block 1329). As an illustrative example, the transmitting device transmits a sequence of special wake-up packets, e.g., each with a format similar to WUR packet 325 and with a specific WUID or a specific packet type value announcing the stopping of WUR Beacon transmission. Alternatively, the transmitting device simply stops transmitting the WUR Beacons and forces a receiving device to detect the absence of the WUR Beacons. In either situation, the transmitting device may further transmit one or more frames with a WUR Mode element that includes a WUR Beacon Interval field with a value set to the special value as described before. The transmitting device wakes up a receiving device in accordance with a configured mode previously agreed between the transmitting device and the receiving device associated with a change to stop (or operations of the stopping of) transmitting WUR Beacons (block 1331). The transmitting device transmits wake-up packet(s) to wake up the receiving device with the arrangement of the wake-up packet(s) depending on the previously configured mode, for example.

Figure 13C:
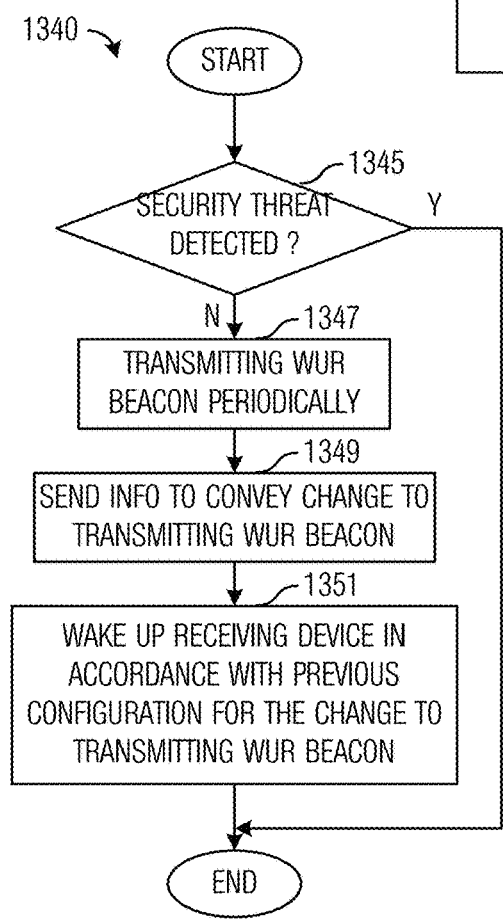
FIG. 13C illustrates a flow diagram of example operations occurring in a transmitting device supporting the selection of a mode of wake-up operation from various modes in response to a stop of a security threat according to example embodiments described herein.

FIG. 13C illustrates a flow diagram of example operations 1340 occurring in a transmitting device supporting the selection of a mode of wake-up operation from various modes in response to a stop of a security threat. Operations 1340 may be indicative of operations occurring in a transmitting device as the transmitting device supports the selection of a mode of wake-up operation from various modes in response to a stop of a security threat.

Operations 1340 begin with the transmitting device performing a check to determine if a security threat has been detected (block 1345). If a security threat has been detected, operations 1340 terminate. If a security threat has not been detected for a specified period, the transmitting device begins to transmit WUR Beacons periodically at a particular periodicity (block 1347). For example, a security threat may be considered as not being detected for the specified period if the transmitting device is able to wake up every receiving device operating in the synchronous duty-cycled mode that the transmitting device attempts to wake up during the specified time period. For another example, when there are no receiving devices operating in the synchronous duty-cycled mode, a security threat may be considered as not being detected if the transmitting device haven't detected any faked WUR Beacon with purposefully erroneous clock information or haven't received any report of detecting a faked WUR Beacon with purposefully erroneous clock information during the specified time period.

The transmitting device sends information conveying a change in how it is transmitting WUR Beacons (block 1349). As an example, the transmitting device transmits a frame with a WUR Mode element that includes a WUR Beacon Interval field with a value set to the periodicity. As another example, the transmitting device transmits a sequence of special wake-up packets, e.g., each with a format similar to WUR packet 325, with a specific WUID or a specific packet type value announcing that it is transmitting WUR Beacons, and with information pertaining to how it is transmitting WUR Beacons, such as the period of WUR Beacons (i.e., the WUR Beacon interval information). The sequence of special wake-up packets may be transmitted in a time-wise tightly packed manner such that the WURx of each receiving device in sleep mode will receive at least one special wake-up packet thus being able to determine that the transmitting device is transmitting WUR Beacons. As yet another example, the transmitting device simply transmits a sequence of WUR Beacons, which also has a format similar to WUR packet 325 but with a specific WUID or a specific packet type value (either of which is known to the receiving devices) conveying that it is a WUR Beacon and with a clock information of the transmitting device, e.g., the timestamp value of the transmitted device. The sequence of WUR Beacons are initially transmitted in a time-wise tightly packed manner (such that the WURx of each receiving device in sleep mode will receive at least one WUR Beacon thus being able to determine that the transmitting device is transmitting WUR Beacons and to correct the local clock of that receiving device so that its "On" periods will be synchronized with the "On" periods as perceived by the transmitting device) and subsequently transmitted periodically in accordance with a WUR Beacon Interval that has been conveyed to the receiving devices either in those initial WUR Beacons or previously using the RCM.

The transmitting device wakes up a receiving device in accordance with a configured mode previously agreed between the transmitting device and the receiving device associated with a change to (or the operations of) transmitting WUR Beacons (block 1351). The transmitting device wakes up the receiving device by transmitting wake-up packet(s) consistent with the previously configured mode, for example.

Figure 13D:
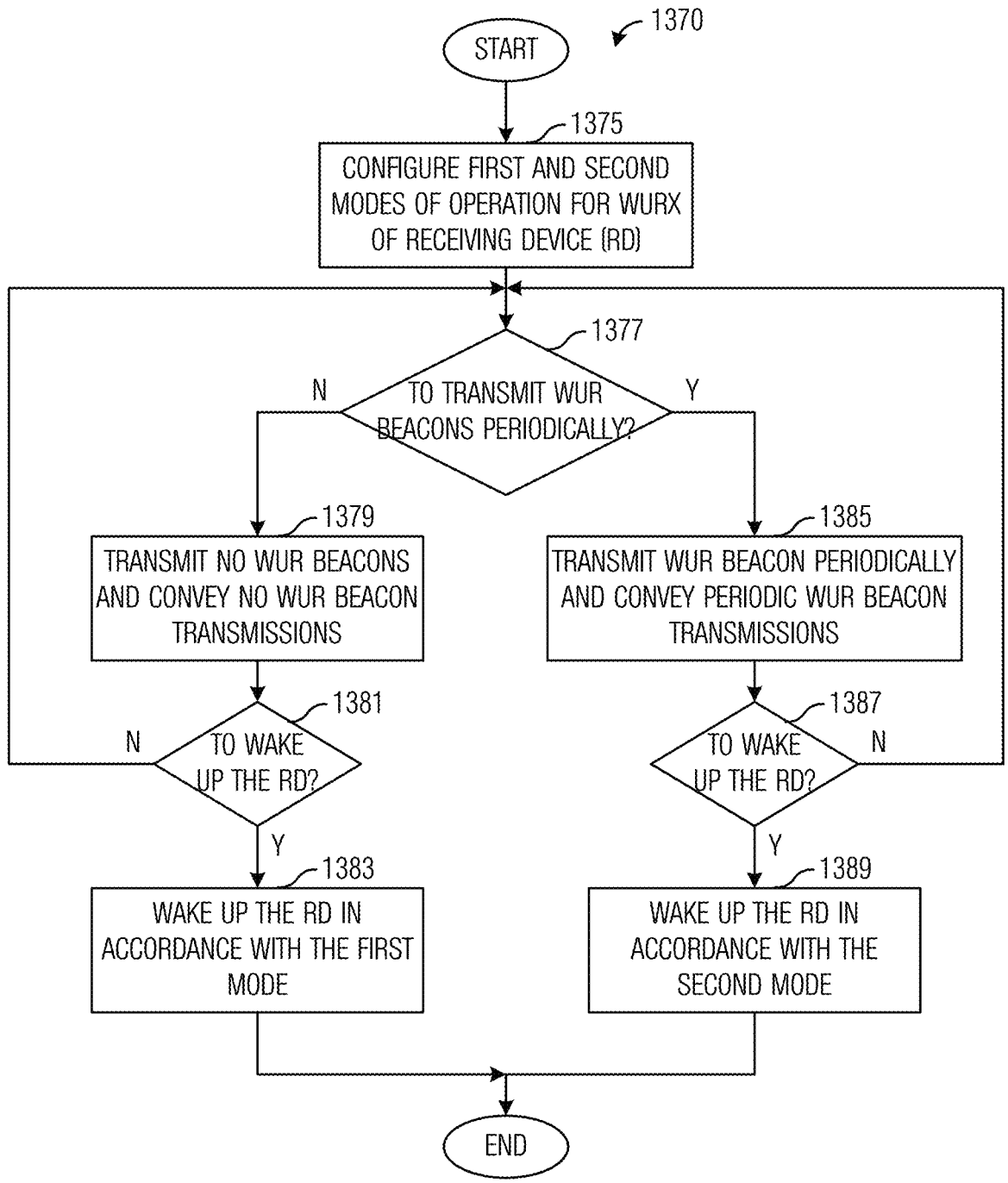
FIG. 13D illustrates a flow diagram of example operations occurring in a transmitting device supporting the selection of a mode of wake-up operation from a plurality of modes in response to determining an operation pertaining to a transmission of WUR Beacons according to example embodiments described herein.

FIG. 13D illustrates a flow diagram of example operations 1370 occurring in a transmitting device supporting the selection of a mode of wake-up operation from a plurality of modes in response to determining an operation pertaining to a transmission of WUR Beacons. Operations 1370 may be indicative of operations occurring in a transmitting device as the transmitting device supports the selection of a mode of wake-up operation from a plurality of modes in response to determining an operation pertaining to a transmission of WUR Beacons.

Operations 1370 begin with the transmitting device configuring a first mode of operations and a second mode of operations with a receiving device, using a RCM of the receiving device while the RCM is active, wherein the first mode of operations is used for operating the WUR receiver of the receiving device when the transmitting device doesn't transmit any WUR beacon and the second mode of operations is used for operating the WUR receiver of the receiving device when the transmitting device transmits WUR beacons periodically (block 1375). For example, the first mode of operations may be the always-on mode or the (enhanced) asynchronous duty-cycled mode, as described before. For another example, the second mode of operations may be the always-on mode, the (enhanced) asynchronous duty-cycled mode, or the synchronous duty-cycled mode, as described before. Configuring the first mode and the second mode with the receiving device may further include exchanging messages that contain the information of the first mode and the second mode with the receiving device. For example, the transmitting device may send information, in a message to the receiving device, to convey the first mode and the second mode. For another example, the transmitting device may receive a message from the receiving device including information that conveys the first mode and the second mode.

The transmitting device determines whether to transmit WUR Beacons periodically or not (block 1377). Each WUR Beacon includes clock information of the transmitting device, which may be used by the receiving device to synchronize a clock of the receiving device with that of the transmitting device. As an example, the transmitting device may determine not to transmit any WUR Beacon when the transmitting device determines a presence of a security threat. An example of the security threat may be a faked WUR Beacon, which contains purposefully erroneous clock information and which may be detected either by the transmitting device or by one of the receiving devices served by the transmitting device and reported to the transmitting device. As another example, the transmitting device may determine to transmit WUR Beacons periodically when the transmitting device determines an absence of the security threat, e.g., when there is no detection nor report of detection of a faked WUR Beacon within a specified time period or when the transmitting device is able to wake up every receiving device operating in the synchronous duty-cycled mode that the transmitting device has attempted to wake up within the specified time period.

If the transmitting device determines not to transmit any WUR Beacon in block 1377, the transmitting device transmits no WUR Beacon and conveys that it transmits no WUR Beacon (block 1379). The transmitting device may stop transmitting any pending WUR Beacons if the transmitting device previously transmitted WUR Beacons periodically. For example, the transmitting device may send information conveying that it transmits no WUR Beacon by transmitting a pre-specified special value in the WUR Beacon Interval field (such as WUR Beacon Interval field 1111 in FIG. 1A) as described before. For another example, the transmitting device may send information conveying that it transmits no WUR Beacon by transmitting a WUR packet including a special WUID or a special packet type that conveys that the transmitting device transmits no WUR Beacon. For yet another example, the transmitted device may wait until it hasn't transmitted any WUR Beacons for a specified time before considering that the absence of the WUR Beacons has been detected by the receiving device(s) as information conveying that the transmitting device doesn't transmit WUR Beacons. Then, the transmitting device determines whether it needs to wake up the RCM of the receiving device (block 1381). If the transmitting device determines that it does not need to wake up the RCM of the receiving device, the transmitting device returns to block 1377. If the transmitting device determines that it does need to wake up the RCM of the receiving device, the transmitting device wakes up the RCM of the receiving device in accordance with the first mode (block 1383). Then, operations 1370 terminate.

If the transmitting device determines to transmit WUR Beacons periodically in block 1377, the transmitting device transmits WUR Beacons periodically and conveys that it transmits WUR Beacons periodically (block 1385). For example, the transmitting device may send information to convey that it transmits WUR Beacons periodically by transmitting a value that is unequal to the pre-specified special value in the WUR Beacon Interval field (such as WUR Beacon Interval field 1111 in FIG. 11) as described before. For another example, the transmitting device may send information to convey that it transmits WUR Beacons periodically by transmitting a WUR packet including a special WUID or a special packet type conveying that the transmitting device transmits WUR Beacons periodically. For yet another example, the transmitted device may wait until it has transmitted a specific number of WUR Beacons before considering that the presence of the WUR Beacons has been detected by the receiving device(s) as information conveying that the transmitting device transmits WUR Beacons periodically. Then, the transmitting device determines whether it needs to wake up the RCM of the receiving device (1387). If the transmitting device determines that it does not need to wake up the RCM of the receiving device, the transmitting device returns to block 1377. If the transmitting device determines that it does need to wake up the RCM of the receiving device, the transmitting device wakes up the RCM of the receiving device in accordance with the second mode (block 1389). Then, operations 1370 terminate.

Although the discussion presented herein focuses on examples using IEEE 802.11 radio access technology, the embodiment techniques described herein can also be applied to other radio access technologies utilizing wake-up radio as means to reduce power consumption of a radio communications module, such as Bluetooth, Bluetooth Low Energy (BLE), IEEE 802.15.4/ZigBee, 3GPP Long Term Evolution (LTE), LTE-Unlicensed (LTE-U), Licensed Assisted Access (LAA), MuLTEFire, 5G New Radio (NR), etc.

Figure 14:
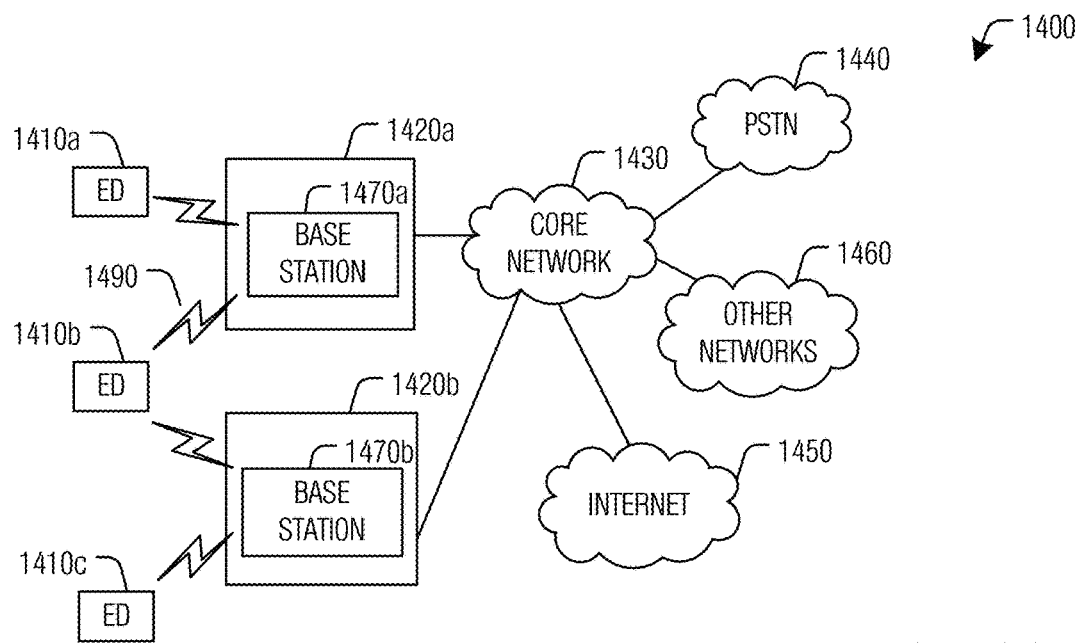
FIG. 14 illustrates an example communication system according to example embodiments described herein.

FIG. 14 illustrates an example communication system 1400. In general, the system 1400 enables multiple wireless or wired users to transmit and receive data and other content. The system 1400 may implement one or more channel access methods, such as code division multiple access (CDMA), time division multiple access (TDMA), frequency division multiple access (FDMA), orthogonal FDMA (OFDMA), or single-carrier FDMA (SC-FDMA).

In this example, the communication system 1400 includes electronic devices (ED) 1410a-1410c, radio access networks (RANs) 1420a-1420b, a core network 1430, a public switched telephone network (PSTN) 1440, the Internet 1450, and other networks 1460. Stations and WUR-capable stations are examples of EDs, and wireless local area networks (WLANs) are examples of RANs. While certain numbers of these components or elements are shown in FIG. 14, any number of these components or elements may be included in the system 1400.

The EDs 1410a-1410c are configured to operate or communicate in the system 1400. For example, the EDs 1410a-1410c are configured to transmit or receive via wireless or wired communication channels. Each ED 1410a-1410c represents any suitable end user device and may include such devices (or may be referred to) as a user equipment or device (UE), wireless transmit/receive unit (WTRU), mobile station, fixed or mobile subscriber unit, cellular telephone, personal digital assistant (PDA), smartphone, laptop, computer, touchpad, wireless sensor, or consumer electronics device.

The RANs 1420a-1420b here include base stations 1470a-1470b, respectively. APs are examples of base stations. Each base station 1470a-1470b is configured to wirelessly interface with one or more of the EDs 1410a-1410c to enable access to the core network 1430, the PSTN 1440, the Internet 1450, or the other networks 1460. For example, the base stations 1470a-1470b may include (or be) one or more of several well-known devices, such as a base transceiver station (BTS), a Node-B (NodeB), an evolved NodeB (eNodeB), a Home NodeB, a Home eNodeB, a site controller, an AP, or a wireless router. The EDs 1410a-1410c are configured to interface and communicate with the Internet 1450 and may access the core network 1430, the PSTN 1440, or the other networks 1460.

In the embodiment shown in FIG. 14, the base station 1470a forms part of the RAN 1420a, which may include other base stations, elements, or devices. Also, the base station 1470b forms part of the RAN 1420b, which may include other base stations, elements, or devices. Each base station 1470a-1470b operates to transmit or receive wireless signals within a particular geographic region or area, sometimes referred to as a "cell." In some embodiments, multiple-input multiple-output (MIMO) technology may be employed having multiple transceivers for each cell.

The base stations 1470a-1470b communicate with one or more of the EDs 1410a-1410c over one or more air interfaces 1490 using wireless communication links. The air interfaces 1490 may utilize any suitable radio access technology.

It is contemplated that the system 1400 may use multiple channel access functionality, including such schemes as described above. In particular embodiments, the base stations and EDs implement LTE, LTE-A, or LTE-B. Of course, other multiple access schemes and wireless protocols may be utilized.

The RANs 1420a-1420b are in communication with the core network 1430 to provide the EDs 14100a-1410c with voice, data, application, Voice over Internet Protocol (VoIP), or other services. Understandably, the RANs 1420a-1420b or the core network 1430 may be in direct or indirect communication with one or more other RANs (not shown). The core network 1430 may also serve as a gateway access for other networks (such as the PSTN 1440, the Internet 1450, and the other networks 1460). In addition, some or all of the EDs 14100a-1410c may include functionality for communicating with different wireless networks over different wireless links using different wireless technologies or protocols. Instead of wireless communication (or in addition thereto), the EDs may communicate via wired communication channels to a service provider or switch (not shown), and to the Internet 1450.

Although FIG. 14 illustrates one example of a communication system, various changes may be made to FIG. 14. For example, the communication system 1400 could include any number of EDs, base stations, networks, or other components in any suitable configuration.

Figure 15A:
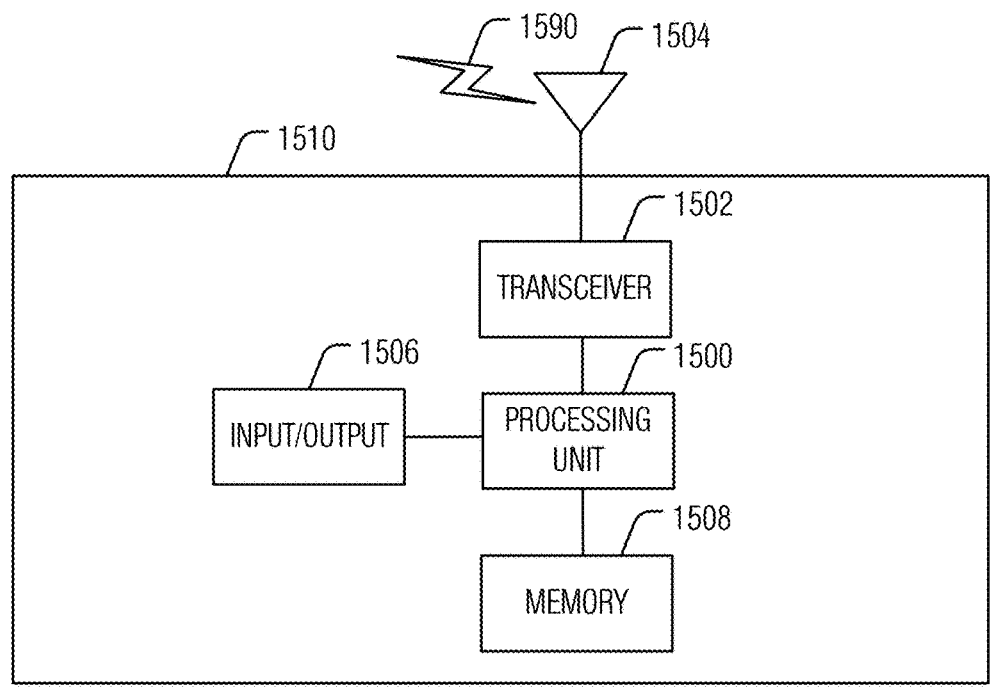
FIGS. 15A and 15B illustrate example devices that may implement the methods and teachings according to this disclosure.
Figure 15B:
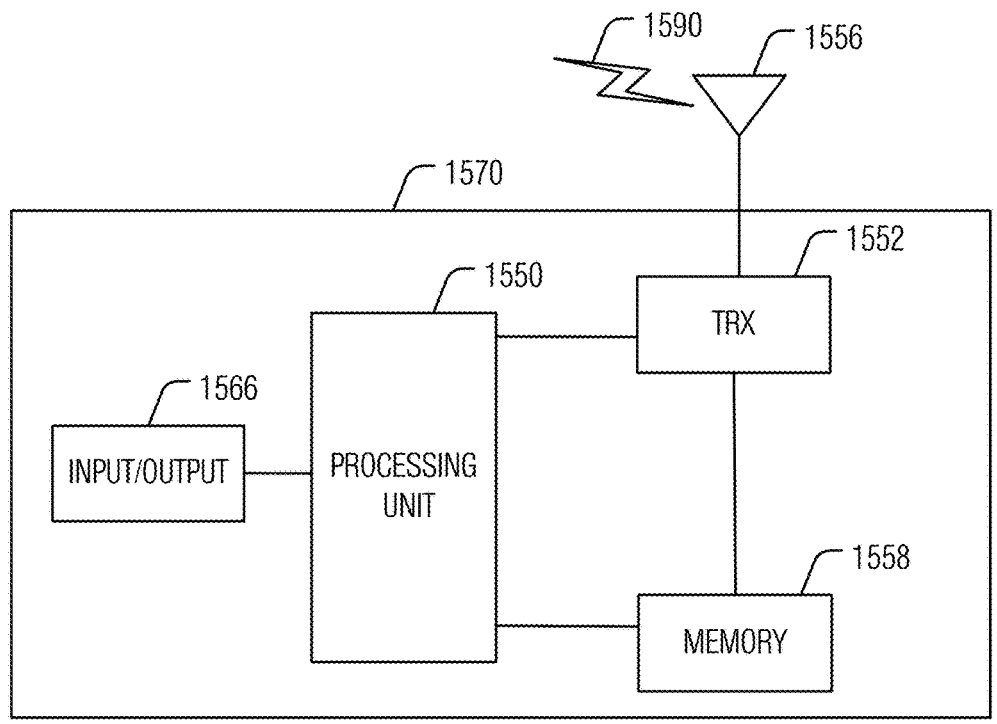

FIGS. 15A and 15B illustrate example devices that may implement the methods and teachings according to this disclosure. In particular, FIG. 15A illustrates an example ED 1510, and FIG. 15B illustrates an example base station 1570. These components could be used in the system 1400 or in any other suitable system.

As shown in FIG. 15A, the ED 1510 includes at least one processing unit 1500. The processing unit 1500 implements various processing operations of the ED 1510. For example, the processing unit 1500 could perform signal coding, data processing, power control, input/output processing, or any other functionality enabling the ED 1510 to operate in the system 1400. The processing unit 1500 also supports the methods and teachings described in more detail above. Each processing unit 1500 includes any suitable processing or computing device configured to perform one or more operations. Each processing unit 1500 could, for example, include a microprocessor, microcontroller, digital signal processor, field programmable gate array, or application specific integrated circuit.

The ED 1510 also includes at least one transceiver 1502. The transceiver 1502 is configured to modulate data or other content for transmission by at least one antenna or NIC (Network Interface Controller) 1504. The transceiver 1502 is also configured to demodulate data or other content received by the at least one antenna 1504. One of the transceivers 1502 is configured to operate as a LP-WUR receiver (i.e., it is configured to receive a wake-up packet addressed to ED 1510 and to wake up another of the transceivers 1502 upon receiving the wake-up packet). Each transceiver 1502 includes any suitable structure for generating signals for wireless or wired transmission or processing signals received wirelessly or by wire. Each antenna 1504 includes any suitable structure for transmitting or receiving wireless or wired signals. One or multiple transceivers 1502 could be used in the ED 1510, and one or multiple antennas 1504 could be used in the ED 1510. Although shown as a single functional unit, a transceiver 1502 could also be implemented using at least one transceiver and at least one separate receiver, wherein the at least one transceiver and the at least one separate receiver are capable of being separately powered on or off in order to facilitating power saving in accordance with various embodiments described herein. Although shown as a single functional unit, a processing unit 1500 could also be implemented using at least one processing unit associated with the at least one transceiver and at least one separate processing unit associated with the at least one separate receiver, wherein the at least one processing unit and the at least one separate processing unit are capable of being separately powered on or off in order to facilitating power saving in accordance with various embodiments described herein.

The ED 1510 further includes one or more input/output devices 1506 or interfaces (such as a wired interface to the Internet 1450). The input/output devices 1506 facilitate interaction with a user or other devices (network communications) in the network. Each input/output device 1506 includes any suitable structure for providing information to or receiving information from a user, such as a speaker, microphone, keypad, keyboard, display, or touch screen, including network interface communications.

In addition, the ED 1510 includes at least one memory 1508. The memory 1508 stores instructions and data used, generated, or collected by the ED 1510. For example, the memory 1508 could store software or firmware instructions executed by the processing unit(s) 1500 and data used to reduce or eliminate interference in incoming signals. Each memory 1508 includes any suitable volatile or non-volatile storage and retrieval device(s). Any suitable type of memory may be used, such as random access memory (RAM), read only memory (ROM), hard disk, optical disc, subscriber identity module (SIM) card, memory stick, secure digital (SD) memory card, and the like. Although shown as a single functional unit, a memory 1508 could also be implemented using at least one memory associated with the at least one transceiver and at least one separate memory associated with the at least one separate receiver, wherein the at least one memory and the at least one separate memory are capable of being separately powered on or off in order to facilitating power saving in accordance with various embodiments described herein As shown in FIG. 15B, the base station 1570 includes at least one processing unit 1550, at least one transceiver 1552, which includes functionality for a transmitter and a receiver, one or more antennas 1556, at least one memory 1558, and one or more input/output devices or interfaces 1566. A scheduler, which would be understood by one skilled in the art, is coupled to the processing unit 1550. The scheduler could be included within or operated separately from the base station 1570. The processing unit 1550 implements various processing operations of the base station 1570, such as signal coding, data processing, power control, input/output processing, or any other functionality. The processing unit 1550 can also support the methods and teachings described in more detail above. Each processing unit 1550 includes any suitable processing or computing device configured to perform one or more operations. Each processing unit 1550 could, for example, include a microprocessor, microcontroller, digital signal processor, field programmable gate array, or application specific integrated circuit.

Each transceiver 1552 includes any suitable structure for generating signals for wireless or wired transmission to one or more EDs or other devices. Each transceiver 1552 further includes any suitable structure for processing signals received wirelessly or by wire from one or more EDs or other devices. Although shown combined as a transceiver 1552, a transmitter and a receiver could be separate components. Each antenna 1556 includes any suitable structure for transmitting or receiving wireless or wired signals. While a common antenna 1556 is shown here as being coupled to the transceiver 1552, one or more antennas 1556 could be coupled to the transceiver(s) 1552, allowing separate antennas 1556 to be coupled to the transmitter and the receiver if equipped as separate components. Each memory 1558 includes any suitable volatile or non-volatile storage and retrieval device(s). Each input/output device 1566 facilitates interaction with a user or other devices (network communications) in the network. Each input/output device 1566 includes any suitable structure for providing information to or receiving information from a user, including network interface communications.

Figure 16:
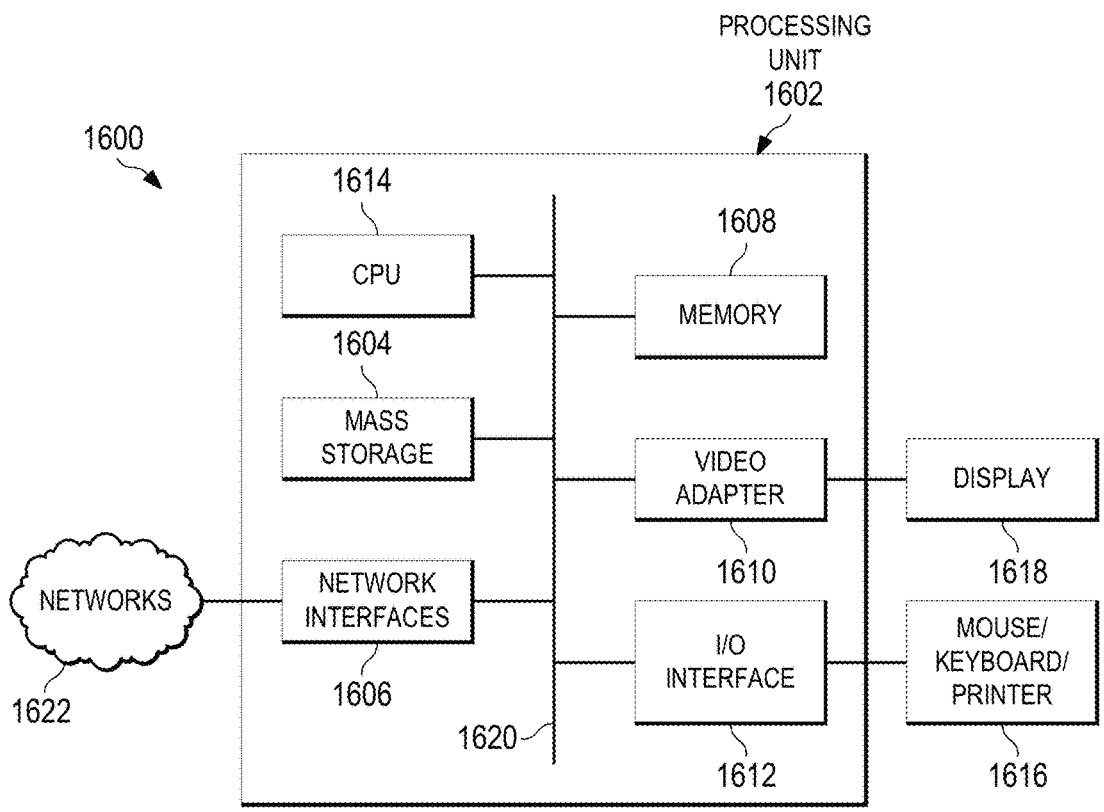
FIG. 16 illustrates a block diagram of a computing system that may be used for implementing the devices and methods disclosed herein.

FIG. 16 is a block diagram of a computing system 1600 that may be used for implementing the devices and methods disclosed herein. For example, the computing system can be any entity of UE, AN, MM, SM, UPGW, AS. Specific devices may utilize all of the components shown or only a subset of the components, and levels of integration may vary from device to device. Furthermore, a device may contain multiple instances of a component, such as multiple processing units, processors, memories, transmitters, receivers, etc. The computing system 1600 includes a processing unit 1602. The processing unit includes a central processing unit (CPU) 1614, memory 1608, and may further include a mass storage device 1604, a video adapter 1610, and an I/O interface 1612 connected to a bus 1620.

The bus 1620 may be one or more of any type of several bus architectures including a memory bus or memory controller, a peripheral bus, or a video bus. The CPU 1614 may comprise any type of electronic data processor. The memory 1608 may comprise any type of non-transitory system memory such as static random access memory (SRAM), dynamic random access memory (DRAM), synchronous DRAM (SDRAM), read-only memory (ROM), or a combination thereof. In an embodiment, the memory 1608 may include ROM for use at boot-up, and DRAM for program and data storage for use while executing programs.

The mass storage 1604 may comprise any type of non-transitory storage device configured to store data, programs, and other information and to make the data, programs, and other information accessible via the bus 1620. The mass storage 1604 may comprise, for example, one or more of a solid state drive, hard disk drive, a magnetic disk drive, or an optical disk drive.

The video adapter 1610 and the I/O interface 1612 provide interfaces to couple external input and output devices to the processing unit 1602. As illustrated, examples of input and output devices include a display 1618 coupled to the video adapter 1610 and a mouse, keyboard, or printer 1616 coupled to the I/O interface 1612. Other devices may be coupled to the processing unit 1602, and additional or fewer interface cards may be utilized. For example, a serial interface such as Universal Serial Bus (USB) (not shown) may be used to provide an interface for an external device.

The processing unit 1602 also includes one or more network interfaces 1606, which may comprise wired links, such as an Ethernet cable, or wireless links to access nodes or different networks. The network interfaces 1606 allow the processing unit 1602 to communicate with remote units via the networks. For example, the network interfaces 1606 may provide wireless communication via one or more transmitters/transmit antennas and one or more receivers/receive antennas. In an embodiment, the processing unit 1602 is coupled to a local-area network 1622 or a wide-area network for data processing and communications with remote devices, such as other processing units, the Internet, or remote storage facilities.

It should be appreciated that one or more steps of the embodiment methods provided herein may be performed by corresponding units or modules. For example, a signal may be transmitted by a transmitting unit or a transmitting module. A signal may be received by a receiving unit or a receiving module. A signal may be processed by a processing unit or a processing module. Other steps may be performed by a scheduling unit or module, a deferring unit or module, a rescheduling unit or module, a stopping unit or module, or a determining unit or module. The respective units or modules may be hardware, software, or a combination thereof. For instance, one or more of the units or modules may be an integrated circuit, such as field programmable gate arrays (FPGAs) or application-specific integrated circuits (ASICs).

Although the present disclosure and its advantages have been described in detail, it should be understood that various changes, substitutions and alterations can be made herein without departing from the spirit and scope of the disclosure as defined by the appended claims.

What is claimed is:

1. A method for operating a wake-up radio (WUR) receiver of a receiving device, the method comprising:
  receiving, by the receiving device from a transmitting device, information conveying a first mode of operation and a second mode of operation, the first and second modes of operation being different, the first mode of operation being used for operating the WUR receiver of the receiving device when the transmitting device does not transmit any WUR beacon, and the second mode of operation being used for operating the WUR receiver of the receiving device when the transmitting device transmits WUR beacons periodically;
  determining, by the receiving device, that the transmitting device is not transmitting any WUR beacons in response to a presence of a security threat, the security threat comprises a WUR beacon containing an erroneous clock information causing the transmitting device and the receiving device to be out of synchronization in time, and based thereon:
    operating, by the receiving device, the WUR receiver of the receiving device in accordance with the first mode of operation, a clock of the WUR receiver of the receiving device being unsynchronized with a clock of the transmitting device; and
  determining, by the receiving device, that the transmitting device is transmitting the WUR beacons periodically in response to an absence of the security threat, and based thereon:
    operating, by the receiving device, the WUR receiver of the receiving device in accordance with the second mode of operation.

2. The method of claim 1, wherein determining that the transmitting device does not transmit any WUR beacon comprises receiving, by the receiving device, from the transmitting device, one of a WUR beacon interval field set to a pre-specified value, a WUR packet including a pre-specified identifier conveying that the transmitting device does not transmit any WUR beacon, or no WUR beacons within a specified time period, the WUR beacon interval field being included in a frame received by a radio communications module (RCM) of the receiving device, and the WUR packet being received by the WUR receiver of the receiving device.

3. The method of claim 1, wherein determining that the transmitting device transmits WUR beacons periodically comprises receiving, by the receiving device, from the transmitting device, one of a WUR beacon interval field set to a value unequal to a pre-specified value, a WUR packet including a pre-specified identifier conveying that the transmitting device transmits WUR beacons periodically, or a specified number of WUR beacons within a specified time period, the WUR beacon interval field being included in a frame received by a RCM of the receiving device, and the WUR packet or the specified number of WUR beacons being received by the WUR receiver of the receiving device.

4. The method of claim 1, wherein the first mode of operation is one of an always-on mode or an asynchronous duty-cycled mode, and the second mode of operation is one of the always-on mode, the asynchronous duty-cycled mode, or a synchronous duty-cycled mode.

5. The method of claim 4, wherein the always-on mode is a mode in which the WUR receiver of the receiving device is active as long as a RCM of the receiving device is operating in a power-saving mode, the asynchronous duty-cycled mode being a mode in which the WUR receiver of the receiving device is active during On periods of repeating duty cycle periods and inactive during Off periods of the repeating duty cycle periods as long as the RCM of the receiving device is operating in the power-saving mode, beginnings and endings of the On periods of the repeating duty cycle periods being determined in accordance with the clock of the WUR receiver of the receiving device, and the synchronous duty-cycled mode being a mode in which the WUR receiver of the receiving device is active during the On periods of the repeating duty cycle periods and inactive during the Off periods of the repeating duty cycle periods as long as the RCM of the receiving device is operating in the power-saving mode, the beginnings and the endings of the On periods of the repeating duty cycle periods being determined in accordance with the clock of the WUR receiver of the receiving device, and the clock of the WUR receiver of the receiving device being synchronized with the clock of the transmitting device.

6. The method of claim 4, wherein the information conveying the always-on mode comprises one of a first value of a mode subfield set in accordance with the always-on mode, a zero value of an off duration subfield, or a duty-cycle duration subfield set equal to an on duration subfield, the information conveying the asynchronous duty-cycled mode comprising a second value of the on duration subfield and one of a third value of the off duration subfield set greater than zero or a fourth value of the duty-cycle duration subfield set greater than the second value, and the information conveying the synchronous duty-cycled mode comprising a fifth value of the on duration subfield, a sixth value of an offset subfield, and one of a seventh value of the off duration subfield set greater than zero or an eighth value of the duty-cycle duration subfield set greater than the fifth value.

7. A method for operating a transmitting device, the method comprising:
  transmitting, by the transmitting device, information conveying a first mode of operation and a second mode of operation to a receiving device, the first and second modes of operation being different, the first mode of operation being used for operating a wake-up radio (WUR) receiver of the receiving device when the transmitting device does not transmit any WUR beacon, and the second mode of operation being used for operating the WUR receiver of the receiving device when the transmitting device transmits WUR beacons periodically;
  determining, by the transmitting device, not to transmit WUR beacons periodically in response to a presence of a security threat, the security threat comprises a WUR beacon containing an erroneous clock information causing the transmitting device and the receiving device to be out of synchronization in time;
in response to determining not to transmit any WUR beacon:
stopping, by the transmitting device, transmission of any pending WUR beacons, and
waking up, by the transmitting device, a radio communications module (RCM) of the receiving device in accordance with the first mode of operation, a clock of the WUR receiver of the receiving device being unsynchronized with a clock of the transmitting device;
determining, by the transmitting device, to transmit WUR beacons periodically in response to an absence of the security threat, each of the WUR beacons including a clock information of the transmitting device; and
in response to determining to transmit WUR beacons periodically:
transmitting, by the transmitting device, WUR beacons periodically, and
waking up, by the transmitting device, the RCM of the receiving device in accordance with the second mode of operation.

8. The method of claim 7, further comprising:
in response to determining not to transmit any WUR beacon:
transmitting, by the transmitting device, a first information to convey that the transmitting device does not transmit any WUR beacon; and
in response to determining to transmit WUR beacons periodically:
transmitting, by the transmitting device, a second information to convey that the transmitting device transmits the WUR beacons periodically.

9. The method of claim 8, wherein the first information is one of a WUR beacon interval field set to a pre-specified value or a first WUR packet including a first pre-specified identifier conveying that the transmitting device does not transmit any WUR beacon, and the second information is one of the WUR beacon interval field set to a value unequal to the pre-specified value, or a second WUR packet including a second pre-specified identifier conveying that the transmitting device transmits WUR beacons periodically.

10. The method of claim 7, wherein the first mode of operation is one of an always-on mode or an asynchronous duty-cycled mode, and the second mode of operation is one of the always-on mode, the asynchronous duty-cycled mode, or a synchronous duty-cycled mode.

11. The method of claim 10, wherein the always-on mode is a mode in accordance with which the transmitting device wakes up the receiving device by transmitting a wake-up packet at any time, the asynchronous duty-cycled mode is a mode in accordance with which the transmitting device is unable to determine beginnings or endings of On periods, during which the WUR receiver of the receiving device is active, in accordance with the clock of the transmitting device, and based thereon, wakes up the receiving device by transmitting a specified number of the wake-up packets, the transmission meeting an interval criteria, and the synchronous duty-cycled mode is a mode in accordance with which the transmitting device is able to determine the beginnings and the endings of the On periods, during which the WUR receiver of the receiving device is active, in accordance with the clock of the transmitting device, and based thereon, wakes up the receiving device by transmitting the wake-up packet during one of the On periods.

12. The method of claim 10, wherein the information conveying the always-on mode comprises one of a first value of a mode subfield set in accordance with the always-on mode, a zero value of an off duration subfield, or a duty-cycle duration subfield set equal to an on duration subfield, the information conveying the asynchronous duty-cycled mode comprises a second value of the on duration subfield and one of a third value of the off duration subfield set greater than zero or a fourth value of the duty-cycle duration subfield set greater than the second value, and the information conveying the synchronous duty-cycled mode comprises a fifth value of the on duration subfield, a sixth value of an offset subfield, and one of a seventh value of the off duration subfield set greater than zero or an eighth value of the duty-cycle duration subfield set greater than the fifth value.

13. A receiving device comprises:
one or more processors; and
a computer readable storage medium storing programming for execution by the one or more processors, the programming including instructions to configure the receiving device to:
receive, from a transmitting device, information conveying a first mode of operation and a second mode of operation, wherein the first and second modes of operation are different, wherein the first mode of operation is used for operating a wake-up radio (WUR) receiver of the receiving device when the transmitting device does not transmit any WUR beacons, and the second mode of operation is used for operating the WUR receiver of the receiving device when the transmitting device transmits WUR beacons periodically,
determine that the transmitting device does not transmit any WUR beacons in response to a presence of a security threat, the security threat comprises a WUR beacon containing an erroneous clock information causing the transmitting device and the receiving device to be out of synchronization in time, and based thereon:
operate the WUR receiver of the receiving device in accordance with the first mode of operation, a clock of the WUR receiver of the receiving device being unsynchronized with a clock of the transmitting device, and
determine that the transmitting device does transmit the WUR beacons periodically in response to an absence of the security threat, and based thereon:
operate the WUR receiver of the receiving device in accordance with the second mode of operation.

14. The receiving device of claim 13, wherein the programming includes instructions to configure the receiving device to receive, from the transmitting device, one of a WUR beacon interval field set to a pre-specified value, a WUR packet including a pre-specified identifier conveying that the transmitting device does not transmit any WUR beacon, or no WUR beacons within a specified time period, wherein the WUR beacon interval field is included in a frame received by a radio communications module (RCM) of the receiving device, and wherein the WUR packet is received by the WUR receiver of the receiving device.

15. The receiving device of claim 13, wherein the programming includes instructions to configure the receiving device to receive, from the transmitting device, one of a WUR beacon interval field set to a value unequal to a pre-specified value, a WUR packet including a pre-specified identifier conveying that the transmitting device transmits WUR beacons periodically, or a specified number of WUR beacons within a specified time period, wherein the WUR beacon interval field is included in a frame received by a RCM of the receiving device, wherein the WUR packet or the specified number of WUR beacons are received by the WUR receiver of the receiving device.

16. The receiving device of claim 13, wherein the first mode of operation is one of an always-on mode or an asynchronous duty-cycled mode, wherein the second mode of operation is one of the always-on mode, the asynchronous duty-cycled mode, or a synchronous duty-cycled mode, wherein the always-on mode is a mode in which the WUR receiver of the receiving device is active as long as a RCM of the receiving device is operating in a power-saving mode, wherein the asynchronous duty-cycled mode is a mode in which the WUR receiver of the receiving device is active during On periods of repeating duty cycle periods and inactive during Off periods of the repeating duty cycle periods as long as the RCM of the receiving device is operating in the power-saving mode, beginnings and endings of the On periods of the repeating duty cycle periods are determined in accordance with the clock of the WUR receiver of the receiving device, and wherein the synchronous duty-cycled mode is a mode in which the WUR receiver of the receiving device is active during the On periods of the repeating duty cycle periods and inactive during the Off periods of the repeating duty cycle periods as long as the RCM of the receiving device is operating in the power-saving mode, the beginnings and the endings of the On periods of the repeating duty cycle periods are determined in accordance with the clock of the WUR receiver of the receiving device, and the clock of the WUR receiver of the receiving device is synchronized with the clock of the transmitting device.

17. A transmitting device comprises:
one or more processors; and
a computer readable storage medium storing programming for execution by the one or more processors, the programming including instructions to configure the transmitting device to:
transmit information conveying a first mode of operation and a second mode of operation with a receiving device, wherein the first and second modes of operation are different, wherein the first mode of operation is used for operating a wake-up radio (WUR) receiver of the receiving device when the transmitting device does not transmit any WUR beacons and the second mode of operation is used for operating the WUR receiver of the receiving device when the transmitting device transmits WUR beacons periodically,
determine not to transmit WUR beacons periodically in response to a presence of a security threat, wherein the security threat comprises a WUR beacon containing an erroneous clock information causing the transmitting device and the receiving device to be out of synchronization in time,
in response to determining not to transmit any WUR beacons, stop transmission of any pending WUR beacons, and wake up a radio communications module (RCM) of the receiving device in accordance with the first mode of operation, a clock of the WUR receiver of the receiving device being unsynchronized with a clock of the transmitting device,
determine to transmit the WUR beacons periodically in response to an absence of the security threat, wherein each of the WUR beacons includes a clock information of the transmitting device, and
in response to determining to transmit WUR beacons periodically, transmit WUR beacons periodically, and wake up the RCM of the receiving device in accordance with the second mode of operation.

18. The transmitting device of claim 17, wherein the programming includes instructions to configure the transmitting device to, in response to determining not to transmit any WUR beacon, transmit a first information conveying that the transmitting device does not transmit any WUR beacon, and in response to determining to transmit WUR beacons periodically, transmit a second information conveying that the transmitting device transmits the WUR beacons periodically.

19. The transmitting device of claim 18, wherein the first information is one of a WUR beacon interval field set to a pre-specified value or a first WUR packet including a first pre-specified identifier conveying that the transmitting device does not transmit any WUR beacon, and wherein the second information is one of the WUR beacon interval field set to a value unequal to the pre-specified value, or a second WUR packet including a second pre-specified identifier conveying that the transmitting device transmits WUR beacons periodically.

20. The transmitting device of claim 17, wherein the first mode of operation is one of an always-on mode or an asynchronous duty-cycled mode, wherein the second mode of operation is one of the always-on mode, the asynchronous duty-cycled mode, or a synchronous duty-cycled mode, wherein the always-on mode is a mode in accordance with which the transmitting device wakes up the receiving device by transmitting a wake-up packet at any time, wherein the asynchronous duty-cycled mode is a mode in accordance with which the transmitting device is unable to determine beginnings or endings of On periods, during which the WUR receiver of the receiving device is active, in accordance with the clock of the transmitting device, and based thereon, wakes up the receiving device by transmitting a specified number of the wake-up packets, the transmission meeting an interval criteria, and wherein the synchronous duty-cycled mode is a mode in accordance with which the transmitting device is able to determine the beginnings and the endings of the On periods, during which the WUR receiver of the receiving device is active, in accordance with the clock of the transmitting device, and based thereon, wakes up the receiving device by transmitting the wake-up packet during one of the On periods.

* * * * *